United States Patent
Schnorr et al.

(10) Patent No.: US 7,273,738 B2
(45) Date of Patent: Sep. 25, 2007

(54) FAMILY GH-61 POLYPEPTIDES

(75) Inventors: Kirk Matthew Schnorr, Holte (DK); Sara Landvik, Copenhagen (DK); Tina Spendler, Malov (DK); Lars Lehmann Hylling Christensen, Allerod (DK)

(73) Assignee: Novozymes A/S, Bagsvaerd (DK)

( * ) Notice: Subject to any disclaimer, the term of this patent is extended or adjusted under 35 U.S.C. 154(b) by 0 days.

(21) Appl. No.: 10/676,902

(22) Filed: Oct. 1, 2003

(65) Prior Publication Data

US 2004/0180420 A1   Sep. 16, 2004

Related U.S. Application Data

(60) Provisional application No. 60/491,131, filed on Jul. 29, 2003, provisional application No. 60/417,733, filed on Oct. 9, 2002.

(30) Foreign Application Priority Data

Oct. 1, 2002  (DK) ................ 2002 01459
Jul. 22, 2003  (DK) ................ 2003 01096

(51) Int. Cl.
*C12N 9/14* (2006.01)
*C12N 9/24* (2006.01)
*C12N 9/42* (2006.01)
*C12P 1/00* (2006.01)

(52) U.S. Cl. ................ 435/195; 435/200; 435/209; 435/41; 435/69.1; 426/391; 426/549

(58) Field of Classification Search ............ 435/195, 435/200, 209, 41, 69.1; 426/391
See application file for complete search history.

(56) References Cited

U.S. PATENT DOCUMENTS 5,610,048 A * 3/1997 Schulein et al. ............ 435/209

FOREIGN PATENT DOCUMENTS

EP  0 396 162  12/2006
WO  97/27293  7/1997

OTHER PUBLICATIONS

Saloheimo et al. (1997) GenBank Accession No. Y11113.*
Itoet al (Aug. 1, 2001) GenBank Accession No. AB055432.*
Haros et al Improvement of Flour quality through carbohydratases treatment during wheat tempering.. 2000. Journal of Agricultural Chemistry 50, 4126-4130.*
Henrissat, B et al, http:/afmb.cnrs-mrs.fr/CAZY/GH_61.ht,"Cazy Family Glycoside Hydrolase Family 61", pp. 1-3 (2004).
Raguz, S et al, Gene, vol. 2, pp. 183-190 (1992).
Saloheimo, M et al, European Journal of Biochemistry, vol. 249, No. 2, pp. 584-591 (1997).
Karisson, J et al, European Journal of Biochemistry, vol. 268, pp. 6498-6507 (2001).

* cited by examiner

*Primary Examiner*—Kathleen Kerr Bragdon
*Assistant Examiner*—Kagnew Gebreyesus
(74) *Attorney, Agent, or Firm*—Elias J. Lambiris

(57) ABSTRACT

The present invention relates to use of an anti-staling GH-61 polypeptide for preparing an edible product.

25 Claims, No Drawings

SEQUENCE LISTING

```
<160> NUMBER OF SEQ ID NOS: 12

<210> SEQ ID NO 1
<211> LENGTH: 699
<212> TYPE: DNA
<213> ORGANISM: T. terrestris
<220> FEATURE:
<221> NAME/KEY: sig_peptide
<222> LOCATION: (1)..(51)
<220> FEATURE:
<221> NAME/KEY: CDS
<222> LOCATION: (1)..(699)
<220> FEATURE:
<221> NAME/KEY: mat_peptide
<222> LOCATION: (52)..()

<400> SEQUENCE: 1 atg aag ctc acc acc tcg gtc gcc ctg ctt gcc gcg gcg ggc gcg caa      48
Met Lys Leu Thr Thr Ser Val Ala Leu Leu Ala Ala Ala Gly Ala Gln
        -15                 -10                  -5 gcc cac tac acc ttc ccg cag acg gac atc aac ggc cag ctc tcc ggc      96
Ala His Tyr Thr Phe Pro Gln Thr Asp Ile Asn Gly Gln Leu Ser Gly
 -1   1               5                  10                  15 gaa tgg gtg acg atc cgt gag acg acg aac cac tac tcg cac ggg ccg     144
Glu Trp Val Thr Ile Arg Glu Thr Thr Asn His Tyr Ser His Gly Pro
                 20                  25                  30 gtc acc gac gtc acg tcg gac cag atc cgc tgc tac gag ctc aac ccg     192
Val Thr Asp Val Thr Ser Asp Gln Ile Arg Cys Tyr Glu Leu Asn Pro
             35                  40                  45 ggc acc ccc gcg ccc cag atc gcc acg gtg cag gcc ggc ggc acc gtg     240
Gly Thr Pro Ala Pro Gln Ile Ala Thr Val Gln Ala Gly Gly Thr Val
         50                  55                  60 acc ttc acc gtc gac cca agc atc cag cac ccg ggc ccg ctg cag ttc     288
Thr Phe Thr Val Asp Pro Ser Ile Gln His Pro Gly Pro Leu Gln Phe
 65                  70                  75 tac atg gcc aag gcg ccg tcg ggc cag acc gcc gcc acc ttc cag ggc     336
Tyr Met Ala Lys Ala Pro Ser Gly Gln Thr Ala Ala Thr Phe Gln Gly
 80                  85                  90                  95 acc ggc aac gtc tgg ttc aag atc tac gag gac ggc ccg tcc ggc ctc     384
Thr Gly Asn Val Trp Phe Lys Ile Tyr Glu Asp Gly Pro Ser Gly Leu
                100                 105                 110 ggc acc agc aac atc acc tgg cct agc agc ggc aaa acc gaa gtc agc     432
Gly Thr Ser Asn Ile Thr Trp Pro Ser Ser Gly Lys Thr Glu Val Ser
            115                 120                 125 gtc aag atc ccc tcg tgc atc gcg ccg ggc gac tac ctc ctg cgc gtg     480
Val Lys Ile Pro Ser Cys Ile Ala Pro Gly Asp Tyr Leu Leu Arg Val
        130                 135                 140 gag cac atc gcg ctg cac agc gcc agc acc gtc ggc ggc gcc cag ttc     528
Glu His Ile Ala Leu His Ser Ala Ser Thr Val Gly Gly Ala Gln Phe
    145                 150                 155
```

```
tac ctc gcg tgc gcc cag ctg acc gtc acc ggc ggc acc ggc acc ctc     576
Tyr Leu Ala Cys Ala Gln Leu Thr Val Thr Gly Gly Thr Gly Thr Leu
160                 165                 170                 175 aac acg ggc gag ctc gtc gcc ttc ccc ggc gcc tac agc gcc acc gac     624
Asn Thr Gly Glu Leu Val Ala Phe Pro Gly Ala Tyr Ser Ala Thr Asp
            180                 185                 190 ccg ggc atc ctc ttc cag ctg tac tgg ccc atc ccg acc agc tac acc     672
Pro Gly Ile Leu Phe Gln Leu Tyr Trp Pro Ile Pro Thr Ser Tyr Thr
                195                 200                 205 aac ccc ggc ccg gcg ccc gtt agc tgc                                 699
Asn Pro Gly Pro Ala Pro Val Ser Cys
        210                 215

<210> SEQ ID NO 2
<211> LENGTH: 233
<212> TYPE: PRT
<213> ORGANISM: T. terrestris

<400> SEQUENCE: 2

Met Lys Leu Thr Thr Ser Val Ala Leu Leu Ala Ala Gly Ala Gln
            -15                 -10                 -5

Ala His Tyr Thr Phe Pro Gln Thr Asp Ile Asn Gly Gln Leu Ser Gly
-1  1               5                   10                  15

Glu Trp Val Thr Ile Arg Glu Thr Thr Asn His Tyr Ser His Gly Pro
                20                  25                  30

Val Thr Asp Val Thr Ser Asp Gln Ile Arg Cys Tyr Glu Leu Asn Pro
            35                  40                  45

Gly Thr Pro Ala Pro Gln Ile Ala Thr Val Gln Ala Gly Gly Thr Val
        50                  55                  60

Thr Phe Thr Val Asp Pro Ser Ile Gln His Pro Gly Pro Leu Gln Phe
65                  70                  75

Tyr Met Ala Lys Ala Pro Ser Gly Gln Thr Ala Ala Thr Phe Gln Gly
80                  85                  90                  95

Thr Gly Asn Val Trp Phe Lys Ile Tyr Glu Asp Gly Pro Ser Gly Leu
                100                 105                 110

Gly Thr Ser Asn Ile Thr Trp Pro Ser Ser Gly Lys Thr Glu Val Ser
            115                 120                 125

Val Lys Ile Pro Ser Cys Ile Ala Pro Gly Asp Tyr Leu Leu Arg Val
        130                 135                 140

Glu His Ile Ala Leu His Ser Ala Ser Thr Val Gly Gly Ala Gln Phe
145                 150                 155

Tyr Leu Ala Cys Ala Gln Leu Thr Val Thr Gly Gly Thr Gly Thr Leu
160                 165                 170                 175

Asn Thr Gly Glu Leu Val Ala Phe Pro Gly Ala Tyr Ser Ala Thr Asp
            180                 185                 190

Pro Gly Ile Leu Phe Gln Leu Tyr Trp Pro Ile Pro Thr Ser Tyr Thr
                195                 200                 205

Asn Pro Gly Pro Ala Pro Val Ser Cys
        210                 215

<210> SEQ ID NO 3
<211> LENGTH: 957
<212> TYPE: DNA
<213> ORGANISM: Humicola insolens
<220> FEATURE:
<221> NAME/KEY: CDS
<222> LOCATION: (1)..(957)
<220> FEATURE:
```

<221> NAME/KEY: sig_peptide
<222> LOCATION: (1)..(45)
<220> FEATURE:
<221> NAME/KEY: mat_peptide
<222> LOCATION: (46)..()
<220> FEATURE:
<221> NAME/KEY: misc_feature
<222> LOCATION: (858)..(957)
<223> OTHER INFORMATION: CBM1 domain

<400> SEQUENCE: 3

```
atg agg ccc ttc tcc ctc gtc gcg ctg gcg acg gcc gtc agc ggc cac      48
Met Arg Pro Phe Ser Leu Val Ala Leu Ala Thr Ala Val Ser Gly His
-15             -10                 -5                  -1  1 gcc atc ttc cag cgc gtg tcg gtt aac ggt gtc gac caa ggc cag ctc      96
Ala Ile Phe Gln Arg Val Ser Val Asn Gly Val Asp Gln Gly Gln Leu
             5                  10                  15 aag ggc gtg cgg gct ccc tcg agc aac tac ccc att gag aac gtc aac     144
Lys Gly Val Arg Ala Pro Ser Ser Asn Tyr Pro Ile Glu Asn Val Asn
        20                  25                  30 cac ccc gac ttt gcc tgc aac acc aac atc cgg cac cgc gac ggc acc     192
His Pro Asp Phe Ala Cys Asn Thr Asn Ile Arg His Arg Asp Gly Thr
    35                  40                  45 gtc atc aag atc ccc gcc ggc gcc acc gtc ggc gcc tgg tgg cag cac     240
Val Ile Lys Ile Pro Ala Gly Ala Thr Val Gly Ala Trp Trp Gln His
50                  55                  60                  65 gag atc ggc ggg ccc tcg ttc ccc ggt gat ccg gat aac ccg atc gct     288
Glu Ile Gly Gly Pro Ser Phe Pro Gly Asp Pro Asp Asn Pro Ile Ala
                70                  75                  80 gcc tcg cac aag ggc ccc atc caa gtc tat ctc gcc aag gtc gac aac     336
Ala Ser His Lys Gly Pro Ile Gln Val Tyr Leu Ala Lys Val Asp Asn
            85                  90                  95 gcc gct acc gcc tct ccc aac ggc ctg cgg tgg ttc aag att gcc gag     384
Ala Ala Thr Ala Ser Pro Asn Gly Leu Arg Trp Phe Lys Ile Ala Glu
        100                 105                 110 aag ggc ctg tcg ggc ggc gtc tgg gcc gtc gac gag atg atc cgc aac     432
Lys Gly Leu Ser Gly Gly Val Trp Ala Val Asp Glu Met Ile Arg Asn
    115                 120                 125 aac ggc tgg cac tac ttc acc atg ccg cag tgc atc gcg ccc ggc cac     480
Asn Gly Trp His Tyr Phe Thr Met Pro Gln Cys Ile Ala Pro Gly His
130                 135                 140                 145 tac ctg atg cgc gtc gag ctg ctg gcg ctg cac tcg gcc agc ttc ccc     528
Tyr Leu Met Arg Val Glu Leu Leu Ala Leu His Ser Ala Ser Phe Pro
                150                 155                 160 ggc ggc gcc cag ttc tac atg gag tgc gcc cag atc gag gtc acc ggc     576
Gly Gly Ala Gln Phe Tyr Met Glu Cys Ala Gln Ile Glu Val Thr Gly
            165                 170                 175 tcg ggc aac ttc tcg ccc tcc gag acg gtc agc ttc ccc ggc gcc tac     624
Ser Gly Asn Phe Ser Pro Ser Glu Thr Val Ser Phe Pro Gly Ala Tyr
        180                 185                 190 ccg gcc aac cac ccg ggt atc gtc gtc agc atc tac gac gcc cag ggt     672
Pro Ala Asn His Pro Gly Ile Val Val Ser Ile Tyr Asp Ala Gln Gly
    195                 200                 205 aac gcc aac aac ggc ggg cgc gag tac cag atc ccc ggg ccg cgg ccg     720
Asn Ala Asn Asn Gly Gly Arg Glu Tyr Gln Ile Pro Gly Pro Arg Pro
210                 215                 220                 225 atc acc tgc tcc ggc ggt gga agc aac aat ggt ggc ggg aac aac aat     768
Ile Thr Cys Ser Gly Gly Gly Ser Asn Asn Gly Gly Gly Asn Asn Asn
                230                 235                 240 ggt ggt gga aac aat aac ggc ggc ggc aac aac aac ggc ggt ggg          816
Gly Gly Gly Asn Asn Asn Gly Gly Gly Asn Asn Asn Gly Gly Gly
            245                 250                 255
```

```
aac aac aac ggt ggc ggt aac acc ggt ggc ggc tcg gcg ccg ctc tgg      864
Asn Asn Asn Gly Gly Gly Asn Thr Gly Gly Gly Ser Ala Pro Leu Trp
            260                 265                 270 ggc cag tgc ggc ggc aat ggg tat tcc ggc ccg acg act tgc gcc gag      912
Gly Gln Cys Gly Gly Asn Gly Tyr Ser Gly Pro Thr Thr Cys Ala Glu
275                 280                 285 ggt act tgc aag aag cag aat gac tgg tac tcg cag tgt acg cct          957
Gly Thr Cys Lys Lys Gln Asn Asp Trp Tyr Ser Gln Cys Thr Pro
290                 295                 300

<210> SEQ ID NO 4
<211> LENGTH: 319
<212> TYPE: PRT
<213> ORGANISM: Humicola insolens

<400> SEQUENCE: 4

Met Arg Pro Phe Ser Leu Val Ala Leu Ala Thr Ala Val Ser Gly His
-15                 -10                 -5                 -1   1

Ala Ile Phe Gln Arg Val Ser Val Asn Gly Val Asp Gln Gly Gln Leu
                5                   10                  15

Lys Gly Val Arg Ala Pro Ser Ser Asn Tyr Pro Ile Glu Asn Val Asn
            20                  25                  30

His Pro Asp Phe Ala Cys Asn Thr Asn Ile Arg His Arg Asp Gly Thr
        35                  40                  45

Val Ile Lys Ile Pro Ala Gly Ala Thr Val Gly Ala Trp Trp Gln His
50                  55                  60                  65

Glu Ile Gly Gly Pro Ser Phe Pro Gly Asp Pro Asn Pro Ile Ala
                    70                  75                  80

Ala Ser His Lys Gly Pro Ile Gln Val Tyr Leu Ala Lys Val Asp Asn
                85                  90                  95

Ala Ala Thr Ala Ser Pro Asn Gly Leu Arg Trp Phe Lys Ile Ala Glu
            100                 105                 110

Lys Gly Leu Ser Gly Gly Val Trp Ala Val Asp Glu Met Ile Arg Asn
        115                 120                 125

Asn Gly Trp His Tyr Phe Thr Met Pro Gln Cys Ile Ala Pro Gly His
130                 135                 140                 145

Tyr Leu Met Arg Val Glu Leu Leu Ala Leu His Ser Ala Ser Phe Pro
                150                 155                 160

Gly Gly Ala Gln Phe Tyr Met Glu Cys Ala Gln Ile Glu Val Thr Gly
            165                 170                 175

Ser Gly Asn Phe Ser Pro Ser Glu Thr Val Ser Phe Pro Gly Ala Tyr
        180                 185                 190

Pro Ala Asn His Pro Gly Ile Val Val Ser Ile Tyr Asp Ala Gln Gly
    195                 200                 205

Asn Ala Asn Asn Gly Gly Arg Glu Tyr Gln Ile Pro Gly Pro Arg Pro
210                 215                 220                 225

Ile Thr Cys Ser Gly Gly Ser Asn Asn Gly Gly Asn Asn
                230                 235                 240

Gly Gly Gly Asn Asn Gly Gly Gly Asn Asn Gly Gly
            245                 250                 255

Asn Asn Asn Gly Gly Gly Asn Thr Gly Gly Gly Ser Ala Pro Leu Trp
            260                 265                 270

Gly Gln Cys Gly Gly Asn Gly Tyr Ser Gly Pro Thr Thr Cys Ala Glu
275                 280                 285

Gly Thr Cys Lys Lys Gln Asn Asp Trp Tyr Ser Gln Cys Thr Pro
```

<210> SEQ ID NO 5
<211> LENGTH: 660
<212> TYPE: DNA
<213> ORGANISM: Coprinus cinereus
<220> FEATURE:
<221> NAME/KEY: CDS
<222> LOCATION: (1)..(660)
<220> FEATURE:
<221> NAME/KEY: sig_peptide
<222> LOCATION: (1)..(57)
<220> FEATURE:
<221> NAME/KEY: mat_peptide
<222> LOCATION: (58)..()

<400> SEQUENCE: 5

| | | | | | | | | | | | | | | | |
|---|---|---|---|---|---|---|---|---|---|---|---|---|---|---|---|
| atg | aag | gtc | ttc | gca | tac | gtc | gcc | ctc | ctc | gcc | gcc | gct | gcc | cag | tcg | 48
| Met | Lys | Val | Phe | Ala | Tyr | Val | Ala | Leu | Leu | Ala | Ala | Ala | Ala | Gln | Ser |
| | | | -15 | | | | -10 | | | | | -5 | | | | gct tct gct cac tac atc tgg acc acc ctc acc gcc ggc ggc cag acc    96
Ala Ser Ala His Tyr Ile Trp Thr Thr Leu Thr Ala Gly Gly Gln Thr
      -1   1              5                  10 acc tcc gcc gtc atc cgc cag ccc ctc aac aac tcc ccc gtc gag gac    144
Thr Ser Ala Val Ile Arg Gln Pro Leu Asn Asn Ser Pro Val Glu Asp
        15              20                  25 gtc tcc tcc ccc cac atg cgc tgc aac gtc aac ccc atg ccc gcc tcg    192
Val Ser Ser Pro His Met Arg Cys Asn Val Asn Pro Met Pro Ala Ser
 30              35                  40                  45 cag acc ctc aac gtt cag gcc ggc tcc agc gtc acc ttc cgc ctc gac    240
Gln Thr Leu Asn Val Gln Ala Gly Ser Ser Val Thr Phe Arg Leu Asp
                    50                  55                  60 aac acc ctc tac cac ccc ggc ccc gcc gcc atc tac ctc ggc caa gtc    288
Asn Thr Leu Tyr His Pro Gly Pro Ala Ala Ile Tyr Leu Gly Gln Val
                65                  70                  75 ccc gcc ggc cag acc gcc gcc tct tgg gac gga agc ggt gct aac tgg    336
Pro Ala Gly Gln Thr Ala Ala Ser Trp Asp Gly Ser Gly Ala Asn Trp
         80                  85                  90 ttc aag atc gac gag ttc ggc gcc cag ttc aac ccc ttc cgc ttc atc    384
Phe Lys Ile Asp Glu Phe Gly Ala Gln Phe Asn Pro Phe Arg Phe Ile
     95                 100                 105 ccc gac ggc cag agc cag ctc tcc acc acc atc ccc tcc aac act ccc    432
Pro Asp Gly Gln Ser Gln Leu Ser Thr Thr Ile Pro Ser Asn Thr Pro
110                 115                 120                 125 agc ggc gag tac ctc ctc cgc atc gag cac atc ggt ctc cac gtc gcc    480
Ser Gly Glu Tyr Leu Leu Arg Ile Glu His Ile Gly Leu His Val Ala
                130                 135                 140 ggc gct ccc caa tac tac atc tcc tgc gcc caa atc cgc gtt aat ggc    528
Gly Ala Pro Gln Tyr Tyr Ile Ser Cys Ala Gln Ile Arg Val Asn Gly
            145                 150                 155 ggt gga ggc ggc aac cca ccc aag gtc tcc atc ccc gga tac gtc tcg    576
Gly Gly Gly Gly Asn Pro Pro Lys Val Ser Ile Pro Gly Tyr Val Ser
        160                 165                 170 agg aac gac ccc ggt ctc acc gtc aac atc cac tgg ccc atc ccc acc    624
Arg Asn Asp Pro Gly Leu Thr Val Asn Ile His Trp Pro Ile Pro Thr
    175                 180                 185 tcc tac acc gtc ccc gga ccc cgc ccc tgg agg gga                    660
Ser Tyr Thr Val Pro Gly Pro Arg Pro Trp Arg Gly
190                 195                 200

<210> SEQ ID NO 6
<211> LENGTH: 220
<212> TYPE: PRT

<213> ORGANISM: Coprinus cinereus

<400> SEQUENCE: 6

```
Met Lys Val Phe Ala Tyr Val Ala Leu Leu Ala Ala Ala Gln Ser
            -15                 -10                  -5

Ala Ser Ala His Tyr Ile Trp Thr Thr Leu Thr Ala Gly Gly Gln Thr
     -1   1                  5                  10

Thr Ser Ala Val Ile Arg Gln Pro Leu Asn Asn Ser Pro Val Glu Asp
     15                  20                  25

Val Ser Ser Pro His Met Arg Cys Asn Val Asn Pro Met Pro Ala Ser
30                  35                  40                  45

Gln Thr Leu Asn Val Gln Ala Gly Ser Ser Val Thr Phe Arg Leu Asp
                50                  55                  60

Asn Thr Leu Tyr His Pro Gly Pro Ala Ile Tyr Leu Gly Gln Val
                65                  70                  75

Pro Ala Gly Gln Thr Ala Ala Ser Trp Asp Gly Ser Gly Ala Asn Trp
            80                  85                  90

Phe Lys Ile Asp Glu Phe Gly Ala Gln Phe Asn Pro Phe Arg Phe Ile
95                  100                 105

Pro Asp Gly Gln Ser Gln Leu Ser Thr Thr Ile Pro Ser Asn Thr Pro
110                 115                 120                 125

Ser Gly Glu Tyr Leu Leu Arg Ile Glu His Ile Gly Leu His Val Ala
                130                 135                 140

Gly Ala Pro Gln Tyr Tyr Ile Ser Cys Ala Gln Ile Arg Val Asn Gly
            145                 150                 155

Gly Gly Gly Asn Pro Pro Lys Val Ser Ile Pro Gly Tyr Val Ser
            160                 165                 170

Arg Asn Asp Pro Gly Leu Thr Val Asn Ile His Trp Pro Ile Pro Thr
    175                 180                 185

Ser Tyr Thr Val Pro Gly Pro Arg Pro Trp Arg Gly
190                 195                 200
```

<210> SEQ ID NO 7
<211> LENGTH: 30
<212> TYPE: DNA
<213> ORGANISM: Primer A for SEQ ID NO: 3

<400> SEQUENCE: 7
gcggaattca tcatgaggcc cttctccctc        30

<210> SEQ ID NO 8
<211> LENGTH: 32
<212> TYPE: DNA
<213> ORGANISM: Primer B for SEQ ID NO: 3

<400> SEQUENCE: 8
atttgcggcc gcttcccgtc atcctctaag gc        32

<210> SEQ ID NO 9
<211> LENGTH: 29
<212> TYPE: DNA
<213> ORGANISM: Primer A for SEQ ID NO: 1

<400> SEQUENCE: 9
gcggaattca tgaagctcac cacctcggt        29

<210> SEQ ID NO 10
<211> LENGTH: 32

```
<212> TYPE: DNA
<213> ORGANISM: Primer B for SEQ ID NO: 1

<400> SEQUENCE: 10
atttgcggcc gcgcagccaa ccaacctgga at                              32

<210> SEQ ID NO 11
<211> LENGTH: 30
<212> TYPE: DNA
<213> ORGANISM: Primer A for SEQ ID NO: 5

<400> SEQUENCE: 11
gcggaattca caatgaaggt cttcgcatac                                 30

<210> SEQ ID NO 12
<211> LENGTH: 32
<212> TYPE: DNA
<213> ORGANISM: Primer B for SEQ ID NO: 5

<400> SEQUENCE: 12
atttgcggcc gcacgatgcg atgagcattt at                              32
```

FAMILY GH-61 POLYPEPTIDES

CROSS REFERENCE

This application claims priority or the benefit under 35 U.S.C. 119 of U.S. Provisional Application Nos. 60/491,131 and 60/417,733, filed on Jul. 29, 2003 and Oct. 9, 2002, respectively, and Danish application nos. PA 2003 01096 and PA 2002 01459, filed on Jul. 22, 2003 and Oct. 1, 2002, respectively, which are hereby incorporated by reference.

The present application contains information in the form of a sequence listing, which is appended to the application and also submitted on a data carrier accompanying this application. The contents of the data carrier are fully incorporated herein by reference.

FIELD OF THE INVENTION

The present invention relates to the use of a GH 61 polypeptide for preparing an edible product. The invention also relates to polypeptides belonging to the GH 61 family of polypeptides which improves the properties of the edible product. The invention further relate to polynucleotides encoding said polypeptides, to nucleic acid constructs comprising such polynucleotides and to expression vectors and recombinant host cells comprising such constructs. The invention also relates to processes for preparing said polypeptides and to compositions comprising said polypeptides.

BACKGROUND OF THE INVENTION

Carbohydrates and glycol-conjugates are substrates for glycosyl transferases (GTs) and glycoside hydrolases (GHs). The structure of glycoside hydrolases began to be solved starting from the 1980s. At the same time, new GH proteins were discovered and their amino acid sequence determined. Two main observations emerged from the new data. 1) The classical E.C. nomenclature system for naming enzyme families was not precise enough to classify the increasing number of enzymes that had different structure yet performed the same enzymatic reaction. 2) Enzymes related by homology could have different enzymatic activity thus also making the E.C. nomenclature system confusing for these related enzymes. A new family based nomenclature system was proposed by Bernard Henrissat in 1991 based on the structure of the enzymes (Henrissat B., A classification of glycosyl hydrolases based on amino-acid sequence similarities. Biochem. J. 280:309–316(1991); Henrissat B., Bairoch A. New families in the classification of glycosyl hydrolases based on amino-acid sequence similarities. Biochem. J. 293:781–788(1993); Henrissat B., Bairoch A. Updating the sequence-based classification of glycosyl hydrolases. Biochem. J. 316:695–696(1996) and Davies G., Henrissat B. Structures and mechanisms of glycosyl hydrolases. Structure 3:853–859(1995).). The classification of glycoside hydrolases in families based on amino acid sequence similarities was introduced because there is a direct relationship between sequence and folding similarities, and such a classification is expected to:

(i) reflect the structural features of the enzymes, which cannot be reflected by the substrate specificity alone, (ii) help to reveal the evolutionary relationships between the enzymes, and (iii) provide a convenient tool to derive mechanistic information.

Amino acid sequences grouped by nature of their similarity to a particular GH family can give ideas as to the activity of the new hypothetical protein. Some of these amino acid sequences, grouped in a GH family by homology have later been suggested to have certain enzymatic activity. So, in short, grouping a new amino acid sequence in a GH family does not specifically indicate the exact enzymatic activity. The enzymatic activity must be demonstrated by an activity assay of the cloned or purified protein. If the assay is difficult determination of the proteins actual function can remain un-revealed for years.

Publicly available information on the GH-61 family counts presently only 6 nucleotide sequences of unknown function. One document discloses, however, a guess that one of these sequences (SwissProt sequence O14405) encode an endoglucanase enzyme (Saloheimo M., Nakari-Setaelae T., Tenkanen M., Penttilae M.; (1997) "cDNA cloning of a *Trichoderma reesei* cellulase and demonstration of endoglucanase activity by expression in yeast."; Eur. J. Biochem. 249:584–591(1997). Work by the same group confirmed that the enzyme GH61A, when purified showed very weak cellulase activity. The group itself admitted that since the activity was three orders of magnitude lower than normal cellulases, that perhaps the cellulose was not the correct native substrate for the enzyme. The group also made an exhaustive study of the purified enzyme with all other known carbohydrate assays (mannanase, galactanase etc.) and found that the enzyme had no activity for these substrates. The authors conclude in their discussion that: "It is therefore unlikely that the fungus would produce Cel61A for its endoglucanase activity when it is already producing more efficient endoglucanses . . . . It is possible that both TrCel61A and AbCel61A are active against specific parts of more complex natural cellulosic substrate. However, further studies are needed to reveal the function of the glycoside hydrolase 61 enzymes" (page 6505).

Presently, the web-site of CAZY (http://afmb.cnrs-mrs.fr/CAZY/) lists the GH-61 familiy as unclassified, meaning that properties like mechanism, catalytic nucleophile/base, catalytic proton donors, and 3-D structure are not known for enzymes belonging to this family. Here the only listed known activity is endoglucanase activity.

Despite extensive screening of *Trichoderma reesei* recombinant yeast libraries for cellulases and recovering many other cellulases from other GH families we have not unambiguously identified any endoglucanase belonging to the GH-61 family from *Trichoderma reesei* thus also indicating that GH61, if that family does include cellulases, have only very weak activity and thus cannot be detected by the normally very sensistive recombinant yeast activity screening. Hence, the present 6 publicly disclosed nucleotide sequences belonging the GH-61 family are either unknown open reading frames sharing homology to SwissProt sequence O14405 or sequences cloned based on purification and sequencing of a cellulose induced gene (Isolation and characterization of a cellulose-growth-specific gene from *Agaricus bisporus*."; Gene 119:183–190(1992), and besides the Cel61A protein mentioned above, there is in the art no knowledge of the function and properties of any protein or peptide belonging to the GH-61 family nor have any enzyme and/or its function been reliably demonstrated.

SUMMARY OF THE INVENTION

Due to our efforts searching for new carbohydrases, we have now for the first time discovered polypeptides belonging to the GH-61 family which provides improved properties in edible products, particularly having an anti-staling effect in edible products.

Hence, in a first aspect the invention provides use of an anti-staling GH-61 polypeptide for preparing an edible product.

In a further aspect the invention provides an isolated GH-61 polypeptide having an anti-staling effect in edible products.

In further aspects the invention provides a polynucleotide encoding the polypeptide of the invention; a nucleic acid construct comprising the polynucleotide encoding the polypeptide, operably linked to one or more control sequences that direct the production of the polypeptide a suitable host; a recombinant expression vector comprising the nucleic acid construct of the invention and to a recombinant host cell comprising the nucleic acid construct of the invention.

In a still further aspect the invention provides a composition comprising the GH-61 polypeptide of the invention.

In still further aspects the invention provides methods for producing a GH-61 polypeptide of the invention including a method comprising:

(a) cultivating a strain, which in its wild-type form is capable of producing the polypeptide, to produce the polypeptide; and
(b) recovering the polypeptide and a method comprising:

(a) cultivating a recombinant host cell of the invention under conditions conducive for production of the polypeptide and
(b) recovering the polypeptide.

In a still further aspect the invention provides a transgenic plant comprising a nucleotide sequence of the invention and capable of expressing the GH-61 polypeptide of the invention.

BRIEF DESCRIPTION OF DRAWINGS

No drawings

SEQUENCE LISTING

The present application contains information in the form of a sequence listing, which is appended to the application and also submitted on a data carrier accompanying this application. The contents of the data carrier are fully incorporated herein by reference.

DETAILED DESCRIPTION OF THE INVENTION

Definitions

The term "edible product" in the context of this invention is a product prepared by heating dough, e.g. by baking or steaming, wherein said product is suitable as a foodstuff for being consumed animals including man. In particular the edible product is leavened before heating. The product may be of a soft or a crisp character, either of a white, light or dark type. Examples are steamed or baked bread (in particular white, whole-meal or rye bread), typically in the form of loaves or rolls, French baguette-type bread, pita bread, tortillas, cakes, pancakes, biscuits, cookies, pie crusts, crisp bread, steamed bread, pizza and the like.

The terms "GH" and "GH family r homology groups" as used herein is to be understood as a Glycoside Hydrolases, classified in accordance with the well established CAZY classification system.

The term "GH-61" as used herein, is to be understood as a family of enzymes, which share common conserved sequence portions and foldings to be classified in family 61 of the well established CAZY GH classification system. In a preferred embodiment mature GH-61 polypeptides of the invention share the following conserved portions:

H at position 1,
A or P at position 59,
G at position 60,
G at position 75,
P or A at position 76,
W or F at position 100,
F or T at position 101,
K or C at position 102,
I or V or L at position 103,
L or I or V or M at position 130,
P at position 131,
G, Xaa, Y at position 137–139
L or V or I or M at position 140
L or V or I or M at position 141
R at position 142
E or Q at positions 143–144,
L or V or I at position 148
H or N at position 149
C at position 163 and
P, G and P at position 209–211.

In the present context "Xaa" means any amino acid. Also in the present context the numbering system for the residues is based on SEQ ID NO:2 wherein the N terminal has been removed to the first histidine of the polypeptide (there after denoted Histidine at position 1). This numbering system of residues may be applied to other GH61 proteins through a multiple sequence alignment with SEQ ID NO: 2 starting from that first Histidine, disregarding gaps generated by the multiple sequence alignment. The relative location of Histidine-1 is easily determined by multiple sequence alignment with SEQ ID No:2. Alignment is be performed by using AlignX in the computer program Vector NTI ver. 7.1 (Informax inc., 7600 Wisconsin Avenue, Suite #1100, Bethesda, Md. 20814, USA). The amino acid alignment is created using the Clustal W algorithm (Nucleic Acid Research, 22 (22): 4673–4680, 1994) and the following additional parameters: Gap opening penalty of 10, Gap extension penalty of 0.05, Gap separation penalty range of 8. Pairwise alignment parameters were Ktuple=1, gap penalty=3, gap length opening penalty=10, gap extension penalty=0.1, window size=5 and diagonals=5.

The term "core sequence" as used herein is to be understood as the sequence of the mature polypeptide catalytic domain excluding other functional domains such as binding domains et.

The term "conserved portion" as used herein is to be understood as an amino acid or amino acid subsequence contained in all GH-61 polypeptides of the invention and thus a common feature of all said polypeptides. The term conserved portions is also used for nucleotides and variants thereof which by virtue of the degeneracy of the code encodes conserved amino acid portions.

The term "identity" as used herein, is to be understood as the homology between two amino acid sequences or between two nucleotide sequences. For purposes of the present invention, the degree of identity between two amino acid sequences is determined by using AlignX in the program of Vector NTI ver. 7.1 (Informax inc., 7600 Wisconsin Avenue Suite #1100, Bethesda, Md. 20814, USA). Amino acid alignment is created using the Clustal W algorithm (Nucleic Acid Research, 22 (22): 4673–4680,1994). The homology score matrix used in the first case was blosum62 and in the second case, exact identity of the amino acid sequences in the alignment was used. The following additional parameters were used: Gap opening penalty of 10, Gap extension penalty of 0.05, Gap separation penalty range of 8. Pairwise alignment parameters were Ktuple=1, gap penalty=3, gap length opening penalty=10, gap extension penalty=0.1, window size=5 and diagonals=5.

The degree of identity between two nucleotide sequences may be determined using the same algorithm and software package as described above for example with the following settings: Gap penalty of 10, and gap length penalty of 10. Pairwise alignment parameters were Ktuple=3, gap penalty=3 and windows=20.

The term "fragment" as used herein about a fragment of an polypeptide of the invention, is to be understood as a polypeptide having one or more amino acids deleted from the amino and/or carboxyl terminus of the amino acid sequence of the polypeptide, while retaining the carbohydrate activation of the polypeptide.

The term "allelic variant" as used herein about allelic variants of a polynucleotide of the invention is to be understood as any of two or more alternative forms of a gene occupying the same chromosomal locus. Allelic variation arises naturally through mutation, and may result in polymorphism within populations. Gene mutations can be silent (no change in the encoded polypeptide) or may encode polypeptides having altered amino acid sequences. An allelic variant of a polypeptide is a polypeptide encoded by an allelic variant of a gene.

The term "modification(s)" as used herein about modified polypeptides or modified polynucleotides is intended to mean any chemical modification of the polypeptide as well as genetic manipulation of the polynucleotide encoding the polypeptide. The modification(s) can be replacement(s) of the amino acid side chain(s), substitution(s), deletion(s) and/or insertions(s) in or at the amino acid(s) of interest.

The term "artificial variant" as used herein is to be understood as an modified polypeptide capable of activating carbohydrates, which has been produced by an organism which is expressing a modified gene as compared to the unmodified polynucleotide encoding the unmodified polypeptide The modified polynucleotide (gene), from which said variant is produced when expressed in a suitable host, is obtained through human intervention.

The term "cDNA" as used herein is intended to mean a DNA molecule which can be prepared by reverse transcription from a mature, spliced, mRNA molecule derived from a eukaryotic cell. cDNA lacks the intron sequences that are usually present in the corresponding genomic DNA. The initial, primary RNA transcript is a precursor to mRNA and it goes through a series of processing events before appearing as mature spliced mRNA. These events include the removal of intron sequences by a process called splicing. When cDNA is derived from mRNA it therefore lacks intron sequences.

The term "nucleic acid construct" as used herein is to be understood as a nucleic acid molecule or polynucleotide, either single- or double-stranded, which is isolated from a naturally occurring gene or which has been modified to contain segments of nucleic acids in a manner that would not otherwise exist in nature. The term nucleic acid construct is synonymous with the term "expression cassette" when the nucleic acid construct contains the control sequences required for expression of a coding sequence of the present invention.

The term "control sequence" as used herein is to be understood as nucleotide sequence including all components, which are necessary or advantageous for the expression of a polypeptide of the present invention. Each control sequence may be native or foreign to the nucleotide sequence encoding the polypeptide. Such control sequences include, but are not limited to, a leader, polyadenylation sequence, propeptide sequence, promoter, signal peptide sequence, and transcription terminator. At a minimum, the control sequences include a promoter, and transcriptional and translational stop signals. The control sequences may be provided with linkers for the purpose of introducing specific restriction sites facilitating ligation of the control sequences with the coding region of the nucleotide sequence encoding a polypeptide.

The term "operably linked" as used herein is to be understood as a configuration in which a control sequence is appropriately placed at a position relative to a nucleotide sequence encoding an polypeptide such that the control sequence directs the expression of the polypeptide.

The term "coding sequence" as used herein is to be understood as a nucleotide sequence, which directly specifies the amino acid sequence of the polypeptide. The boundaries of the coding sequence are generally determined by an open reading frame, which usually begins with the ATG start codon. The coding sequence typically includes DNA, cDNA, and recombinant nucleotide sequences.

The term "expression" as used herein is to be understood as including any step involved in the production of the polypeptide including, but not limited to, transcription, post-transcriptional modification, translation, post-translational modification, and secretion.

The term "expression vector" as used herein is to be understood as a polynucleotide molecule, linear or circular, that comprises a segment encoding an polypeptide of the invention, and which is operably linked to additional segments that provide for its transcription.

The term "host cell" as used herein, includes any cell type which is susceptible to transformation with a nucleic acid construct.

The terms "polynucleotide probe", "hybridization" as well as the various stringency conditions are defined infra.

GH-61 Polypeptides

The GH-61 polypeptides of the invention all share the characteristics described supra. Preferably, the mature GH-61 polypeptide comprise in its naturally occurring form the conserved portions of
   a Hisitidine (H) at position 1,
   A or P at position 59,
   G at position 60,
   G at position 75,
   P or A at position 76,
   W or F at position 100,
   F or T at position 101,
   K or C at position 102,
   I or V or L at position 103,
   L or I or V or M at position 130,
   P at position 131,
   G, Xaa and Y at position 137–139
   L or V or I or M at position 140,
   L or V or I or M at position 141,
   R at position 142,
   E or Q at positions 143–144, L or V or I at position 148,
H or N at position 149,
C at position 163 and
P and G and P at position 209–211,
when adopting the above mentioned numbering system.

In particular the GH-61 polypeptide is an isolated polypeptide meaning that a preparation of the polypeptide contains at the most 90% by weight of other polypeptide material with which it may be natively associated (lower percentages of other polypeptide material are preferred, e.g. at the most 80% by weight, at the most 60% by weight, at the most 50% by weight, at the most 40% at the most 30% by weight, at the most 20% by weight, at the most 10% by weight, at the most 9% by weight, at the most 8% by weight, at the most 6% by weight, at the most 5% by weight, at the most 4% at the most 3% by weight, at the most 2% by weight, at the most 1% by weight and at the most ½% by weight). Thus, in particular the isolated polypeptide is at least 92% pure, i.e. that the polypeptide constitutes at least 92% by weight of the total polypeptide material present in the preparation, and higher percentages are preferred such as at least 94% pure, at least 95% pure, at least 96% pure, at least 96% pure, at least 97% pure, at least 98% pure, at least 99%, and at the most 99.5% pure. In particular, it is preferred that the polypeptides disclosed herein are in "essentially pure form", i.e. that the polypeptide preparation is essentially free of other polypeptide material with which it is natively associated. This can be accomplished, for example, by preparing the polypeptide by means of well-known recombinant methods.

The GH-61 polypeptide of the invention may be synthetically made, naturally occurring or a combination thereof. In a particular embodiment the polypeptide of the invention may be obtained from a microorganism such as a prokaryotic cell, an archaeal cell or a eucaryotic cell. The cell may further have been modified by genetic engineering (cf. Sources of GH-61 polypeptides, vide infra).

In another particular embodiment, the polypeptide of the invention have size from about 5 kDa to about 500 kDa, in particular from about 10 kDa to about 250 kDa, more particularly from about 20 kDa to 100 kDa.

In a still further embodiment, the polypeptide of the invention may be functionally stabile over at a temperature of up to 120° C., in particular up to 100° C. in particular up to 80° C., more particularly up to 60° C.

The polypeptides of the invention are as said GH-61 polypeptides and have an anti-staling effect on edible products of the invention. In particular the GH-61 polypeptides have a beneficial effect on the firmness, the elasticity and/or the water mobility of the edible product.

The advantageous effects in edible products prepared using the GH-61 polypeptides of the invention are clear from the experiments. Further due to its classification in the GH-61 family it is presently contemplated that the GH-61 polypeptide of the invention is an enzyme, in particular a having hydrolase activity, particularly a carbohydrate activity. Further, concluding from the experiments disclosed herein the exemplified GH-61 polypeptides seems to have at least a minor activity towards oat xylan, birchwood xylan and/or wheat arabino-xylan. Hence, in a particular embodiment the GH-61 polypeptide of the invention exhibits at least a minor activity against these substrates.

In a further embodiment, the GH-61 polypeptide of the invention may exhibit optimum substrate hydrolysis at pH 5–9.

In a still further embodiment, the polypeptide of the invention may exhibit optimum substrate hydrolysis at a temperature within the range from about 10° C. to about 90° C., such as about 10° C. to about 80° C., particularly in the range from about 20° C. to about 60° C. or about 70° C. to about 90° C.

In a particular embodiment, the polypeptide exhibit at least 20%, in particular at least 40%, such as at least 50%, in particular at least 60%, such as at least 70%, more particularly at least 80%, such as at least 90%, most particularly at least 95%, such as about or at least 100% of the polypeptide activity of either of the polypeptides consisting of the amino acid sequences shown as the mature GH-61 polypeptide of SEQ ID NO:2, SEQ ID NO:4 or SEQ ID NO:6. The polypeptide preferably comprises or consists of, an amino acid sequence which has a degree of identity to the amino acids of the mature GH-61 polypeptides of SEQ ID NO:2, SEQ ID NO:4 or SEQ ID NO:6 of at least 65%, particularly at least 70%, e.g. at least 75%, more particularly at least 80%, such as at least 85%, even more particularly at least 90%, most particularly at least 95%, e.g. at least 96%, such as at least 97%, and even most particularly at least 98%, such as at least 99% (hereinafter "homologous polypeptides"), with the proviso that the polypeptide belong to the GH-61 family and that the polypeptide preferably comprise the above mentioned conserved amino acid portions.

In a particular embodiment, the amino acid sequence differs by at the most ten amino acids (e.g. by ten amino acids), in particular by at the most five amino acids (e.g. by five amino acids), such as by at the most four amino acids (e.g. by four amino acids), e.g. by at the most three amino acids (e.g. by three amino acids) from amino acids of the mature GH-61 polypeptides of SEQ ID NO:2, SEQ ID NO:4 or SEQ ID NO:6, observing the above mentioned proviso. In a particular embodiment, the amino acid sequence of the polypeptide differs by at the most two amino acids (e.g. by two amino acids), such as by one amino acid from amino acids of the mature GH-61 polypeptides of SEQ ID NO:2, SEQ ID NO:4 or SEQ ID NO:6.

Aligning the polypeptides consisting of the amino acid sequence shown as amino acids of the mature GH-61 polypeptides of SEQ ID NO:2, SEQ ID NO:4 or SEQ ID NO:6 with the closest prior art and using the aligment method described above (see the section entitled "Definitions"), the closest known sequence is Cel61A a Trichoderma reesei (Hypocrea jecorina) endo-1,4-glucanase IV.

Particularly, the polypeptide comprises the amino acid sequence of the mature GH-61 polypeptides of SEQ ID NO:2, SEQ ID NO:4 and SEQ ID NO:6; an allelic variant thereof; or a fragment thereof that provides an anti-staling effect on edible products In a further particular embodiment, the polypeptide consists of amino acids of the mature GH-61 polypeptides of SEQ ID NO:2, SEQ ID NO:4 or SEQ ID NO:6

The polypeptide of the invention may be a wild-type polypeptide identified and isolated from a natural source.

Furthermore, the polypeptide of the invention may be prepared by the DNA shuffling technique, such as described in J. E. Ness et al. Nature Biotechnology 17, 893–896 (1999).

The present invention also encompasses artificial variants of the polypeptides of the invention, where said polypeptides has been mutated by adding, substituting and/or deleting one or more amino acids from said polypeptide polypeptides while retaining the polypeptide activity and the conserved portions. Hence, the polypeptide of the invention may be an artificial variant of a GH-61 polypeptide, wherein at least one substitution, deletion and/or insertion of an amino acid has been made to the amino acid sequence in a parent GH-61 polypeptide amino acid sequence. In particular the artificial variant comprises, in particular consists of, an amino acid sequence that has at least one substitution, deletion and/or insertion of an amino acid as compared to amino acids the mature GH-61 polypeptides of SEQ ID NO:2, SEQ ID NO:4 of SEQ ID NO:6. In particular the mutation is made outside the conserved portion of the sequence or a substitution may be made within a conserved portion while maintaining the polypeptide in the GH-61 family. For example for position 76 P may be substituted by A, while sill being conserved according to the definition.

Such artificial variants may be constructed by standard techniques known in the art usually followed by screening and/or characterization. Standard techniques includes classical mutagenesis, e.g. by UV irradiation of the cells or treatment of cells with chemical mutagens as described by Gerhardt et al. (1994); in vivo gene shuffling as described in WO 97/07205; in vitro shuffling as described by Stemmer, (1994) or WO 95/17413, random mutagenesis as described by Eisenstadt E. et al., (1994); PCR techniques as described by Poulsen et al. (1991); family shuffling as described by J. E. Ness, et al, Nature Biotechnology, vol.17, pp. 893–896 (1999); site-directed mutagenesis as described by Sambrook et al. (1989), Sambrook et al., Molecular Cloning. A Laboratory Manual, Cold Spring Harbor, N.Y. A general description of nucleotide substitution can be found in e.g. Ford et al., 1991, Protein Expression and Purification 2, p. 95–107.

Such standard genetic engineering methods may also be used prepare a diversified library of variant nucleotide sequences from the genes encoding one or more parent polypeptides, expressing the polypeptide variants in a suitable host cell and selecting a preferred variant(s). A diversified library can be established by a range of techniques known to the art (Reetz M T; Jaeger K E, in Biocatalysis—from Discovery to Application edited by Fessner W D, Vol. 200, pp. 31–57 (1999); Stemmer, Nature, vol. 370, p.389–391, 1994; Zhao and Arnold, Proc. Natl. Acad. Sci., USA, vol. 94, pp. 7997–8000, 1997; or Yano et al., Proc. Natl. Acad. Sci., USA, vol. 95, pp 5511–5515, 1998).

In one embodiment of the invention, amino acid changes (in the artificial variant as well as in wild-type polypeptides) are of a minor nature, that is conservative amino acid substitutions that do not significantly affect the folding and/or activity of the protein; small deletions, typically of one to about 30 amino acids; small amino- or carboxyl-terminal extensions, such as an amino-terminal methionine residue; a small linker peptide of up to about 20–25 residues; or a small extension that facilitates purification by changing net charge or another function, such as a poly-histidine tract, an antigenic epitope or a binding domain.

Examples of conservative substitutions are within the group of basic amino acids (arginine, lysine and histidine), acidic amino acids (glutamic acid and aspartic acid), polar amino acids (glutamine and asparagine), hydrophobic amino acids (leucine, isoleucine, valine and methionine), aromatic amino acids (phenylalanine, tryptophan and tyrosine), and small amino acids (glycine, alanine, serine and threonine). Amino acid substitutions which do not generally alter and or impair the function of a protein are known in the art and are described, for example, by H. Neurath and R. L. Hill, 1979, In, The Proteins, Academic Press, New York. The most commonly occurring exchanges are Ala/Ser, Val/Ile, Asp/Glu, Thr/Ser, Ala/Gly, Ala/Thr, Ser/Asn, Ala/Val, Ser/Gly, Tyr/Phe, Ala/Pro, Lys/Arg, Asp/Asn, Leu/Ile, Leu/Val, Ala/Glu, and Asp/Gly as well as these in reverse.

In an interesting embodiment of the invention, the amino acid changes are of such a nature that the physico-chemical properties of the polypeptides are altered. For example, amino acid changes may be performed, which improve the thermal stability of the polypeptide, which alter the substrate specificity, which changes the pH optimum, and the like.

Particularly, the number of such substitutions, deletions and/or insertions in the polypeptide of the invention, particularly those of the mature polypeptides of SEQ ID NO:2, SEQ ID NO:4 or SEQ ID NO:6 to produce an artificial variant is at the most 10, such as at the most 9, e.g. at the most 8, more preferably at the most 7, e.g. at the most 6, such as at the most 5, most preferably at the most 4, e.g. at the most 3, such as at the most 2, in particular at the most 1.

In a particular embodiment, the artificial variant is a variant, which has an altered, preferably reduced, immunogenicity, especially allergenicity, in animals including man as compared to a parent polypeptide. The term "immunogenicity" in this context is to be understood as the artificial variant having an altered, in particular reduced, binding ability to antibodies as well as having an altered ability to provoke production of antibodies when administered to an animal, including intravenous, cutaneous, subcutaneous, oral and intratracheal administration.

Administration of the artificial variant may causes an alteration in the immunoglobulin levels in the animal body, such as in IgE, IgG and IgM or an alteration in the cytokine level in the animal body. Methods for mapping immunogenic/antigenic epitopes of a protein, preparing variants with altered immunogenicity and methods for measuring an immunological response is well known to the art and are described e.g. in WO 92/10755, WO 00/26230, WO 00/26354 and WO 01/31989.

In a further embodiment, the present invention relates to GH-61 polypeptides having an anti-staling effect in edible products which are encoded by nucleotide sequences which hybridize under very low stringency conditions, particularly under low stringency conditions, more particularly under medium stringency conditions, more particularly under medium-high stringency conditions, even more particularly under high stringency conditions, and most particularly under very high stringency conditions with a polynucleotide probe selected from the group consisting of (i) the complementary strand of nucleotides 52 to 699 of SEQ ID NO:1, 46 to 957 of SEQ ID NO:3 or 58 to 660 of SEQ ID NO:5, (ii) the complementary strand of the cDNA sequence contained in nucleotides 52 to 699 of SEQ ID NO:1, 46 to 957 of SEQ ID NO:3 or 58 to 660 of SEQ ID NO:5

(iii) the complementary strand of nucleotides 46 to 857 of SEQ ID NO:3, (iv) the complementary strand of nucleotides 52 to 300 of SEQ ID NO:1, 46 to 501 of SEQ ID NO:3 or 58 to 300 of SEQ ID NO:5 and/or (v) the complementary strand of nucleotides 301 to 699 of SEQ ID NO:1, 502 to 957 of SEQ ID NO:3 or 301 to 660 of SEQ ID NO:5, (J. Sambrook, E. F. Fritsch, and T. Maniatus, 1989, Molecular Cloning, A Laboratory Manual, 2d edition, Cold Spring Harbor, N.Y.).

In particular, the polypeptide of the invention is encoded by a polynucleotide comprising the nucleotide sequence of nucleotides 52 to 699 of SEQ ID NO:1, 46 to 957 of SEQ ID NO:3 or 58 to 660 of SEQ ID NO:5 or sequences differing from 52 to 699 of SEQ ID NO:1, 46 to 957 of SEQ ID NO:3 or 58 to 660 of SEQ ID NO:5 by virtue of the degeneracy of the genetic code. More particularly, the polypeptide of the invention is encoded by a polynucleotide consisting of nucleotide sequence of nucleotides 52 to 699 of SEQ ID NO:1, 46 to 957 of SEQ ID NO:3 or 58 to 660 of SEQ ID NO:5 or sequences differing from 52 to 699 of SEQ ID NO:1, 46 to 957 of SEQ ID NO:3 or 58 to 660 of SEQ ID NO:5 by virtue of the degeneracy of the genetic code.

The nucleotide sequences of nucleotides SEQ ID NO:1, SEQ ID NO:3 or of SEQ ID NO:5 or a subsequence thereof, as well as the amino acid sequences of SEQ ID NO:2, SEQ ID NO:4 or SEQ ID NO:6 or a fragment thereof, may be used to design a polynucleotide probe to identify and clone DNA encoding GH-61 polypeptides of the invention from strains of different genera or species according to methods well known in the art. In particular, such probes can be used for hybridization with the genomic or cDNA of the genus or species of interest, following standard Southern blotting procedures, in order to identify and isolate the corresponding gene therein. Such probes can be considerably shorter than the entire sequence, but should be at least 15, preferably at least 25, more preferably at least 35 nucleotides in length, such as at least 70 nucleotides in length. It is, however, preferred that the polynucleotide probe is at least 100 nucleotides in length. For example, the polynucleotide probe may be at least 200 nucleotides in length, at least 300 nucleotides in length, at least 400 nucleotides in length or at least 500 nucleotides in length. Even longer probes may be used, e.g., polynucleotide probes which are at least 600 nucleotides in length, at least 700 nucleotides in length, at least 800 nucleotides in length, or at least 900 nucleotides in length. Both DNA and RNA probes can be used. The probes are typically labeled for detecting the corresponding gene (for example, with $^{32}$P, $^{3}$H, 35S, biotin, or avidin).

Thus, a genomic DNA or cDNA library prepared from such other organisms may be screened for DNA which hybridizes with the probes described above and which encodes the polypeptides of the invention. Genomic or other DNA from such other organisms may be separated by agarose or polyacrylamide gel electrophoresis, or other separation techniques. DNA from the libraries or the separated DNA may be transferred to, and immobilized, on nitrocellulose or other suitable carrier materials. In order to identify a clone or DNA which has the required homology and/or identity or is homologous and/or identical with of nucleotides 52 to 699 of SEQ ID NO:1, 46 to 957 of SEQ ID NO:3 or 58 to 660 of SEQ ID NO:5 the carrier material with the immobilized DNA is used in a Southern blot.

For purposes of the present invention, hybridization indicates that the nucleotide sequence hybridizes to a labeled polynucleotide probe which again hybridizes to the nucleotide sequence shown in nucleotides 52 to 699 of SEQ ID NO:1, 46 to 957 of SEQ ID NO:3 or 58 to 660 of SEQ ID NO:5 under very low to very high stringency conditions. Molecules to which the polynucleotide probe hybridizes under these conditions may be detected using X-ray film or by any other method known in the art. Whenever the term "polynucleotide probe" is used in the present context, it is to be understood that such a probe contains at least 15 nucleotides. In particular the probe comprise nucleotides encoding conserved portions of a Hisitidine (H) at position 1, A or P at position 59, G at position 60, G at position 75, P or A at position 76, W or F at position 100, F or T at position 101, K or C at position 102, I or V or L at position 103, L or I or V or M at position 130, P at position 131, G and Xaa and Y at position 137–139, L or V or I or M at position 140, L or V or I or M at position 141, R at position 142, E or Q at positions 143–144, L or V or I at position 148, H or N at position 149, C at position 163 and P and G and P at position 209–211 in the mature polypeptide.

In an interesting embodiment, the polynucleotide probe is the complementary strand of nucleotides 52 to 300 of SEQ ID NO:1, 46 to 501 of SEQ ID NO:3 or 58 to 300 of SEQ ID NO:5. In another embodiment the polynucleotide probe is the complementary strand of nucleotides 301 to 699 of SEQ ID NO:1, 502 to 957 of SEQ ID NO:3 or 301 to 660 of SEQ ID NO:5.

In another interesting embodiment, the polynucleotide probe is the complementary strand of the nucleotide sequence which encodes the polypeptide of SEQ ID NO:2, SEQ ID NO:4 or SEQ ID NO:6 or the mature polypeptides thereof. In a further interesting embodiment, the polynucleotide probe is the complementary strand of SEQ ID NO:1, SEQ ID NO:3 or SEQ ID NO:5. In a still further interesting embodiment, the polynucleotide probe is the complementary strand of the region of SEQ ID NO:1, SEQ ID NO:3 or SEQ ID NO:5 encoding the mature polypeptide.

For long probes of at least 100 nucleotides in length, very low to very high stringency conditions are defined as prehybridization and hybridization at 42° C. in 5×SSPE, 1.0% SDS, 5× Denhardt's solution, 100 μg/ml sheared and denatured salmon sperm DNA, following standard Southern blotting procedures. Preferably, the long probes of at least 100 nucleotides do not contain more than 1000 nucleotides. For long probes of at least 100 nucleotides in length, the carrier material is finally washed three times each for 15 minutes using 2×SSC, 0.1% SDS at 42° C. (very low stringency), preferably washed three times each for 15 minutes using 0.5 ×SSC, 0.1% SDS at 42° C. (low stringency), more preferably washed three times each for 15 minutes using 0.2×SSC, 0.1% SDS at 42° C. (medium stringency), even more preferably washed three times each for 15 minutes using 0.2×SSC, 0.1% SDS at 55° C. (medium-high stringency), most preferably washed three times each for 15 minutes using 0.1×SSC, 0.1% SDS at 60° C. (high stringency), in particular washed three times each for 15 minutes using 0.1×SSC, 0.1% SDS at 68° C. (very high stringency).

Although not particularly preferred, it is contemplated that shorter probes, e.g. probes which are from about 15 to 99 nucleotides in length, such as from about 15 to about 70 nucleotides in length, may be also be used. For such short probes, stringency conditions are defined as prehybridization, hybridization, and washing post-hybridization at 5° C. to 10° C. below the calculated Tm using the calculation according to Bolton and McCarthy (1962, Proceedings of the National Academy of Sciences USA 48:1390) in 0.9 M NaCl, 0.09 M Tris-HCl pH 7.6, 6 mM EDTA, 0.5% NP-40, 1× Denhardt's solution, 1 mM sodium pyrophosphate, 1 mM sodium monobasic phosphate, 0.1 mM ATP, and 0.2 mg of yeast RNA per ml following standard Southern blotting procedures.

For short probes which are about 15 nucleotides to 99 nucleotides in length, the carrier material is washed once in 6×SCC plus 0.1% SDS for 15 minutes and twice each for 15 minutes using 6×SSC at 5° C. to 10° C. below the calculated Tm.

Sources of Polypeptides

The polypeptide of the present invention may be obtained from microorganisms of any genus. For purposes of the present invention, the term "obtained from", as used herein shall mean that the polypeptide encoded by the nucleotide sequence is produced by a cell in which the nucleotide sequence is naturally present or into which the nucleotide sequence has been inserted.

Further polypeptides obtainable from microorganisms are in a particular embodiment an extracellular polypeptides i.e. a polypeptide which is secreted or otherwise exported from a microorganism to its surrounding medium.

Eukaryotic Sources

The polypeptide of the invention may be obtained from eukaryotes particularly, plant cells or fungi. Particularly, the polypeptide may be derived from fungi that degrade carbohydrates, such as cellulosic substrates. Such fungi include e.g. Ascomycota, Basidiomycota, Zygomycota or Oomycota. In particular *Verticillium tenerum, Coprinus cinerius, Diplodia gossypinna, Humicola insolens, Dichotomocladium hesseltinei, Pseudoplectania nigrella, Psilocybe inquilina* and *Trichophaea saccata*.

Other relevant fungi may be yeasts such as a *Candida, Kluyveromyces, Pichia, Saccharomyces, Schizosaccharomyces,* or *Yarrowia* or filamentous fungi such as an *Acremonium, Aspergillus, Aureobasidium, Cryptococcus, Filibasidium, Fusarium, Humicola, Magnaporthe, Mucor, Myceliophthora, Neocallimastix, Neurospora, Paecilomyces, Penicillium, Piromyces, Schizophyllum, Talaromyces, Thermoascus, Thielavia, Tolypocladium,* or *Trichoderma*.

In an interesting embodiment, the polypeptide is derived from *Saccharomyces carisbergensis, Saccharomyces cerevisiae, Saccharomyces diastaticus, Saccharomyces douglasii, Saccharomyces kluyveri, Saccharomyces norbensis* or *Saccharomyces oviformis*.

In another interesting embodiment, the polypeptide is derived from *Aspergillus aculeatus, Aspergillus awamori, Aspergillus foetidus, Aspergillus japonicus, Aspergillus nidulans, Aspergillus niger, Aspergillus oryzae, Fusarium bactridioides, Fusarium cerealis, Fusarium crookwellense, Fusarium culmorum, Fusarium graminearum, Fusarium graminum, Fusarium heterosporum, Fusarium negundi, Fusarium oxysporum, Fusarium reticulatum, Fusarium roseum, Fusarium sambucinum, Fusarium sarcochroum, Fusarium sporotrichioides, Fusarium sulphureum, Fusarium torulosum, Fusarium trichothecioides, Fusarium venenatum, Humicola insolens, Humicola lanuginosa, Mucor miehei, Myceliophthora thermophila, Neurospora crassa, Penicillium purpurogenum, Trichoderma harzianum, Trichoderma koningii, Trichoderma longibrachiatum, Trichoderma reesei,* or *Trichoderma viride*.

It will be understood that for the aforementioned species, the invention encompasses both the perfect and imperfect states, and other taxonomic equivalents, e.g., anamorphs, regardless of the species name by which they are known. Those skilled in the art will readily recognize the identity of appropriate equivalents.

Strains of these species are readily accessible to the public in a number of culture collections, such as the American Type Culture Collection (ATCC), Deutsche Sammlung von Mikroorganismen und Zellkulturen GmbH (DSM), Centraalbureau Voor Schimmelcultures (CBS), and Agricultural Research Service Patent Culture Collection, Northern Regional Research Center (NRRL).

Furthermore, such polypeptides may be identified and obtained from other sources including microorganisms isolated from nature (e.g., soil, composts, water, etc.) using the above-mentioned probes. Techniques for isolating microorganisms from natural habitats are well known in the art. The nucleotide sequence may then be derived by similarly screening a genomic or cDNA library of another microorganism. Once a nucleotide sequence encoding a polypeptide has been detected with the probe(s), the sequence may be isolated or cloned by utilizing techniques which are known to those of ordinary skill in the art (see, e.g., Sambrook et al., 1989, supra).

Polypeptides encoded by nucleotide sequences of the present invention also include fused polypeptides or cleavable fusion polypeptides in which another polypeptide is fused at the N-terminus or the C-terminus of the polypeptide or fragment thereof. A fused polypeptide is produced by fusing a nucleotide sequence (or a portion thereof) encoding another polypeptide to a nucleotide sequence (or a portion thereof) of the present invention. Techniques for producing fusion polypeptides are known in the art, and include ligating the coding sequences encoding the polypeptides so that they are in frame and that expression of the fused polypeptide is under control of the same promoter(s) and terminator.

Nucleotide Sequences

The present invention also relates to polynucleotides comprising a nucleotide sequence, which encodes a GH-61 polypeptide of the invention. In a particular embodiment, the nucleotide sequence is set forth in SEQ ID NO:1, SEQ ID NO:3 or SEQ ID NO:5. In a more particular embodiment, the nucleotide sequence is the region of SEQ ID NO:1, SEQ ID NO:3 or SEQ ID NO:5 encoding the mature GH-61 polypeptide.

The present invention also encompasses polynucleotides comprising, particularly containing or more particularly consisting of, nucleotide sequences which encode a polypeptide consisting of the amino acid sequence of SEQ ID NO:2, SEQ ID NO:4 or SEQ ID NO:6. or the mature polypeptide thereof including nucleotide sequences differing from SEQ ID NO:1, SEQ ID NO:3 or SEQ ID NO:5 by virtue of the degeneracy of the genetic code.

The present invention also relates to polynucleotides comprising, preferably consisting of, a subsequence:
  which encode fragments of SEQ ID NO:2 that have an anti-staling effect in edible products and contains the conserved portions. In particular the subsequence is a subsequence of SEQ ID NO:1
  which encode fragments of SEQ ID NO:4 that have an anti-staling effect in edible products and contains the conserved portions. In particular the subsequence is a subsequence of SEQ ID NO:3
  which encode fragments of SEQ ID NO:6 that have an anti-staling effect in edible products and contains the conserved portions. In particular the subsequence is a subsequence of SEQ ID NO:5

A subsequence of SEQ ID NO:1, SEQ ID NO:3 or SEQ ID NO:5 is a nucleotide sequence encompassed by SEQ ID NO:1, SEQ ID NO:3 or SEQ ID NO:5 except that one or more nucleotides from the 5' and/or 3' end have been deleted.

The present invention also relates to polynucleotides comprising, preferably consisting of, a modified nucleotide sequence which comprises at least one modification/mutation in the mature polypeptide coding sequence of SEQ ID NO:1, SEQ ID NO:3 or SEQ ID NO:5, and where the modified nucleotide sequence encodes a polypeptide comprising a H at position 1, A or P at position 59, G at position 60, G at position 75, P or A at position 76, W or F at position 100, F or T at position 101, K or C at position 102I or V or L at position 103, L or I or V or M at position 130, P at position 131, G and Xaa and Y at position 137–139, L or V or I or M at position 140, L or V or I or M at position 141, R at position 142, E or Q at positions 143–144, L or V or I at position 148, H or N at position 149, C at position 163 and P and G and P at position 209–211.

The techniques used to isolate and/or clone a nucleotide sequence encoding an polypeptide are known in the art and include isolation from genomic DNA, preparation from cDNA, or a combination thereof. The cloning of the nucleotide sequences of the present invention from such genomic DNA can be effected, e.g., by using the well known polymerase chain reaction (PCR) or antibody screening of expression libraries to detect cloned DNA fragments with shared structural features. See, e.g., Innis et al., 1990, *PCR: A Guide to Methods and Application*, Academic Press, New York. Other amplification procedures such as ligase chain reaction (LCR), ligated activated transcription (LAT) and nucleotide sequence-based amplification (NASBA) may be used. The nucleotide sequence may be cloned from a strain of *Humicola* or *Coprinus*, or another or related organism and thus, for example, may be an allelic or species variant of the polypeptide encoding region of the nucleotide sequence.

The nucleotide sequence may be obtained by standard cloning procedures used in genetic engineering to relocate the nucleotide sequence from its natural location to a different site where it will be reproduced. The cloning procedures may involve excision and isolation of a desired fragment comprising the nucleotide sequence encoding the polypeptide, insertion of the fragment into a vector molecule, and incorporation of the recombinant vector into a host cell where multiple copies or clones of the nucleotide sequence will be replicated. The nucleotide sequence may be of genomic, cDNA, RNA, semisynthetic, synthetic origin, or any combinations thereof.

The present invention also relates to a polynucleotide encoding a GH-61 polypeptide of the invention comprising, preferably consisting of, a nucleotide sequence which has at least 65% identity with nucleotides 52 to 699 of SEQ ID NO:1, 46 to 957 of SEQ ID NO:3 or 58 to 660 of SEQ ID NO:5. Particularly, the nucleotide sequence has at least 70% identity, e.g. at least 80% identity, such as at least 90% identity, more preferably at least 95% identity, such as at least 96% identity, e.g. at least 97% identity, even more preferably at least 98% identity, such as at least 99% with nucleotides 52 to 699 of SEQ ID NO:1, 46 to 957 of SEQ ID NO:3 or 58 to 660 of SEQ ID NO:5. The degree of identity between two nucleotide sequences is determined as described previously (see the section entitled "Definitions"). Particularly, the nucleotide sequence comprises nucleotides 52 to 699 of SEQ ID NO:1, 46 to 957 of SEQ ID NO:3 or 58 to 660 of SEQ ID NO:5. In an even more particular embodiment, the nucleotide sequence consists of nucleotides 52 to 699 of SEQ ID NO:1, 46 to 957 of SEQ ID NO:3 or 58 to 660 of SEQ ID NO:5.

Modification of a nucleotide sequence encoding an polypeptide of the present invention may be necessary for the synthesis of an polypeptide, which comprises an amino acid sequence that has at least one substitution, deletion and/or insertion as compared to amino acids 18–233 of SEQ ID NO:2, 16–319 of SEQ ID NO:4 or 20–220 of SEQ ID NO:6. These artificial variants may differ in properties or other way from the polypeptide isolated from its native source, e.g., variants may differ in carbohydrate activation capabilities, carbohydrate specificity, thermostability, pH optimum or the like.

It will be apparent to those skilled in the art that such modifications can be made to preserve the membership of the polypeptide to the GH-61 homology group and can be made outside regions critical to the function of the molecule regions and still result in a polypeptide. Amino acid residues essential to the function or the GH-61 characteristics of the polypeptide encoded by the nucleotide sequence of the invention are therefore preferably not subject to modification, such as substitution. Amino acid residues essential to the function may be identified according to procedures known in the art, such as site-directed mutagenesis or alanine-scanning mutagenesis (see, e.g., Cunningham and Wells, 1989, *Science* 244: 1081–1085). In the latter technique, mutations are introduced at every positively charged residue in the molecule, and the resultant mutant molecules are tested for the carbohydrate activation function to identify amino acid residues that are critical to the function of the molecule. Sites of carbohydrate-polypeptide interaction can also be determined by analysis of the three-dimensional structure as determined by such techniques as nuclear magnetic resonance analysis, crystallography or photoaffinity labelling (see, e.g., de Vos et al., 1992, *Science* 255: 306–312; Smith et al., 1992, *Journal of Molecular Biology* 224: 899–904; Wlodaver et al.,1992, *FEBS Letters* 309: 59–64).

Moreover, a nucleotide sequence encoding a polypeptide of the present invention may be modified by introduction of nucleotide substitutions which do not give rise to another amino acid sequence of the polypeptide encoded by the nucleotide sequence, but which correspond to the codon usage of the host organism intended for production of the polypeptide.

The introduction of a mutation into the nucleotide sequence to exchange one nucleotide for another nucleotide may be accomplished by site-directed mutagenesis using any of the methods known in the art. Particularly useful is the procedure, which utilizes a supercoiled, double stranded DNA vector with an insert of interest and two synthetic primers containing the desired mutation. The oligonucleotide primers, each complementary to opposite strands of the vector, extend during temperature cycling by means of Pfu DNA polymerase. On incorporation of the primers, a mutated plasmid containing staggered nicks is generated. Following temperature cycling, the product is treated with Dpnl which is specific for methylated and hemimethylated DNA to digest the parental DNA template and to select for mutation-containing synthesized DNA. Other procedures known in the art may also be used. For a general description of nucleotide substitution, see, e.g. Ford et al., 1991, *Protein Expression and Purification* 2: 95–107.

The present invention also relates to a polynucleotide comprising, preferably consisting of, a nucleotide sequence which encodes a GH-61 polypeptide and which hybridizes under very low stringency conditions, preferably under low stringency conditions, more preferably under medium stringency conditions, more preferably under medium-high stringency conditions, even more preferably under high stringency conditions, and most preferably under very high stringency conditions with a polynucleotide probe selected from the group consisting of:

(i) the complementary strand of nucleotides 52 to 699 of SEQ ID NO: 1, 46 to 957 of SEQ ID NO:3 or 58 to 660 of SEQ ID NO:5, (ii) the complementary strand of the cDNA sequence contained in nucleotides 52 to 699 of SEQ ID NO:1, 46 to 957 of SEQ ID NO:3 or 58 to 660 of SEQ ID NO:5

(iii) the complementary strand of nucleotides 46 to 857 of SEQ ID NO:3, (iv) the complementary strand of nucleotides 52 to 300 of SEQ ID NO:1, 46 to 501 of SEQ ID NO:3 or 58 to 300 of SEQ ID NO:5, (v) the complementary strand of nucleotides 301 to 699 of SEQ ID NO:1, 502 to 957 of SEQ ID NO:3 or 301 to 660 of SEQ ID NO:5, (J. Sambrook, E. F. Fritsch, and T. Maniatus, 1989, Molecular Cloning, A Laboratory Manual, 2d edition, Cold Spring Harbor, N.Y.).

As will be understood, details and particulars concerning hybridization of the nucleotide sequences will be the same or analogous to the hybridization aspects discussed in the section titled "GH-61 polypeptides" herein.

The present invention also encompass a storage medium, such as a computer disk, containing in digital form or in any other form the sequences as mentioned herein.

Nucleic Acid Construct Comprising Nucleotide Sequences

The present invention also relates to nucleic acid constructs comprising a nucleotide sequence of the invention operably linked to one or more control sequences that direct the expression of the coding sequence in a suitable host cell under conditions compatible with the control sequences.

A nucleotide sequence encoding a polypeptide of the invention may be manipulated in a variety of ways to provide for expression of the polypeptide. Manipulation of the nucleotide sequence prior to its insertion into a vector may be desirable or necessary depending on the expression vector. The techniques for modifying nucleotide sequences utilizing recombinant DNA methods are well known in the art.

The control sequence may be an appropriate promoter sequence, a nucleotide sequence which is recognized by a host cell for expression of the nucleotide sequence. The promoter sequence contains transcriptional control sequences, which mediate the expression of the polypeptide. The promoter may be any nucleotide sequence which shows transcriptional activity in the host cell of choice including mutant, truncated, and hybrid promoters, and may be obtained from genes encoding extracellular or intracellular polypeptides either homologous or heterologous to the host cell.

Examples of suitable promoters for directing the transcription of the nucleic acid constructs of the present invention, especially in a bacterial host cell, are the promoters obtained from the *E. coli* lac operon, *Streptomyces coelicolor* agarase gene (dagA), *Bacillus subtilis* levansucrase gene (sacB), *Bacillus licheniformis* alpha-amylase gene (amyL), *Bacillus stearothermophilus* maltogenic amylase gene (amyM), *Bacillus amyloliquefaciens* alphaamylase gene (amyQ), *Bacillus licheniformis* penicillinase gene (penP), *Bacillus subtilis* xylA and xylB genes, and prokaryotic beta-lactamase gene (Villa-Kamaroff et al., 1978, *Proceedings of the National Academy of Sciences USA* 75: 3727–3731), as well as the tac promoter (DeBoer et al., 1983, *Proceedings of the National Academy of Sciences USA* 80: 21–25). Further promoters are described in "Useful proteins from recombinant bacteria" in *Scientific American*, 1980, 242: 74–94; and in Sambrook et al., 1989, supra.

Examples of suitable promoters for directing the transcription of the nucleic acid constructs of the present invention in a filamentous fungal host cell are promoters obtained from the genes for *Aspergillus oryzae* TAKA amylase, *Rhizomucor miehei* aspartic proteinase, *Aspergillus niger* neutral alpha-amylase, *Aspergillus niger* acid stable alpha-amylase, *Aspergillus niger* or *Aspergillus awamori* glucoamylase (glaA), *Rhizomucor miehei* lipase, *Aspergillus oryzae* alkaline protease, *Aspergillus oryzae* triose phosphate isomerase, *Aspergillus nidulans* acetamidase, and *Fusarium oxysporum* trypsin-like protease (WO 96/00787), as well as the NA2-tpi promoter (a hybrid of the promoters from the genes for *Aspergillus niger* neutral alpha-amylase and *Aspergillus oryzae* triose phosphate isomerase), and mutant, truncated, and hybrid promoters thereof.

In a yeast host, useful promoters are obtained from the genes for *Saccharomyces cerevisiae* enolase (ENO-1), *Saccharomyces cerevisiae* galactokinase (GAL1), *Saccharomyces cerevisiae* alcohol dehydrogenase/glyceraldehyde-3-phosphate dehydrogenase (ADH2/GAP), and *Saccharomyces cerevisiae* 3-phosphoglycerate kinase. Other useful promoters for yeast host cells are described by Romanos et al., 1992, *Yeast* 8: 423–488.

The control sequence may also be a suitable transcription terminator sequence, a sequence recognized by a host cell to terminate transcription. The terminator sequence is operably linked to the 3' terminus of the nucleotide sequence encoding the polypeptide. Any terminator which is functional in the host cell of choice may be used in the present invention.

Preferred terminators for filamentous fungal host cells are obtained from the genes for *Aspergillus oryzae* TAKA amylase, *Aspergillus niger* glucoamylase, *Aspergillus nidulans* anthranilate synthase, *Aspergillus niger* alpha-glucosidase, and *Fusarium oxysporum* trypsin-like protease.

Preferred terminators for yeast host cells are obtained from the genes for *Saccharomyces cerevisiae* enolase, *Saccharomyces cerevisiae* cytochrome C (CYC1), and *Saccharomyces cerevisiae* glyceraldehyde-3-phosphate dehydrogenase. Other useful terminators for yeast host cells are described by Romanos et al., 1992, supra.

The control sequence may also be a suitable leader sequence, a non-translated region of an mRNA which is important for translation by the host cell. The leader sequence is operably linked to the 5' terminus of the nucleotide sequence encoding the polypeptide. Any leader sequence that is functional in the host cell of choice may be used in the present invention. Preferred leaders for filamentous fungal host cells are obtained from the genes for *Aspergillus oryzae* TAKA amylase and *Aspergillus nidulans* triose phosphate isomerase.

Suitable leaders for yeast host cells are obtained from the genes for *Saccharomyces cerevisiae* enolase (ENO-1), *Saccharomyces cerevisiae* 3-phosphoglycerate kinase, *Saccharomyces cerevisiae* alpha-factor, and *Saccharomyces cerevisiae* alcohol dehydrogenase/glyceraldehyde-3-phosphate dehydrogenase (ADH2/GAP).

The control sequence may also be a polyadenylation sequence, a sequence operably linked to the 3' terminus of the nucleotide sequence and which, when transcribed, is recognized by the host cell as a signal to add polyadenosine residues to transcribed mRNA. Any polyadenylation sequence which is functional in the host cell of choice may be used in the present invention.

Preferred polyadenylation sequences for filamentous fungal host cells are obtained from the genes for *Aspergillus oryzae* TAKA amylase, *Aspergillus niger* glucoamylase, *Aspergillus nidulans* anthranilate synthase, *Fusarium oxysporum* trypsin-like protease, and *Aspergillus niger* alpha-glucosidase.

Useful polyadenylation sequences for yeast host cells are described by Guo and Sherman, 1995, *Molecular Cellular Biology* 15: 5983–5990.

The control sequence may also be a signal peptide coding region that codes for an amino acid sequence linked to the amino terminus of a polypeptide and directs the encoded polypeptide into the cell's secretory pathway. The 5' end of the coding sequence of the nucleotide sequence may inherently contain a signal peptide coding region naturally linked in translation reading frame with the segment of the coding region which encodes the secreted polypeptide. Alternatively, the 5' end of the coding sequence may contain a signal peptide coding region which is foreign to the coding sequence. The foreign signal peptide coding region may be required where the coding sequence does not naturally contain a signal peptide coding region. Alternatively, the foreign signal peptide coding region may simply replace the natural signal peptide coding region in order to enhance secretion of the polypeptide. However, any signal peptide coding region which directs the expressed polypeptide into the secretory pathway of a host cell of choice may be used in the present invention.

The signal peptide coding region is nucleotides 1 to 51 of SEQ ID NO:1, 1 to 51 of SEQ ID NO:3 or 1 to 57 of SEQ ID NO:5 which encode amino acids 18 to 233 of SEQ ID NO:2, 16 to 319 of SEQ ID NO:4 or 20 to 220 of SEQ ID NO:6.

Effective signal peptide coding regions for bacterial host cells are the signal peptide coding regions obtained from the genes for *Bacillus* NCIB 11837 maltogenic amylase, *Bacillus stearothermophilus* alpha-amylase, *Bacillus licheniformis* subtilisin, *Bacillus licheniformis* betalactamase, *Bacillus stearothermophilus* neutral proteases (nprT, nprS, nprM), and *Bacillus subtilis* prsA. Further signal peptides are described by Simonen and Palva, 1993, *Microbiological Reviews* 57: 109–137.

Effective signal peptide coding regions for filamentous fungal host cells are the signal peptide coding regions obtained from the genes for *Aspergillus oryzae* TAKA amylase, *Aspergillus niger* neutral amylase, *Aspergillus niger* glucoamylase, *Rhizomucor miehei* aspartic proteinase, *Humicola insolens* cellulase, and *Humicola lanuginosa* lipase.

Useful signal peptides for yeast host cells are obtained from the genes for *Saccharomces cerevisiae* alpha-factor and *Saccharomyces cerevisiae* invertase. Other useful signal peptide coding regions are described by Romanos et al., 1992, supra.

The control sequence may also be a propeptide coding region that codes for an amino acid sequence positioned at the amino terminus of a polypeptide. The resultant polypeptide may be denoted a pro-polypeptide or propolypeptide. A propolypeptide is generally inactive and can be converted to a mature active polypeptide by catalytic or autocatalytic cleavage of the propeptide from the propolypeptide. The propeptide coding region may be obtained from the genes for *Bacillus subtilis* alkaline protease (aprE), *Bacillus subtilis* neutral protease (nprT), *Saccharomyces cerevisiae* alpha-factor, *Rhizomucor miehei* aspartic proteinase, and *Myceliophthora thermophila* laccase (WO 95/33836).

Where both signal peptide and propeptide regions are present at the amino terminus of a polypeptide, the propeptide region is positioned next to the amino terminus of a polypeptide and the signal peptide region is positioned next to the amino terminus of the propeptide region.

In yeast, the ADH2 system or GAL1 system may be used. In filamentous fungi, the TAKA alpha-amylase promoter, *Aspergillus niger* glucoamylase promoter, and *Aspergillus oryzae* glucoamylase promoter may be used as regulatory sequences. Other examples of regulatory sequences are those which allow for gene amplification. In eukaryotic systems, these include the dihydrofolate reductase gene which is amplified in the presence of methotrexate, and the metallothionein genes which are amplified with heavy metals. In these cases, the nucleotide sequence encoding the polypeptide would be operably linked with the regulatory sequence.

Recombinant Expression Vector Comprising Nucleic Acid Construct

The present invention also relates to recombinant expression vectors comprising the nucleic acid construct of the invention. The various nucleotide and control sequences described above may be joined together to produce a recombinant expression vector, which may include one or more convenient restriction sites to allow for insertion or substitution of the nucleotide sequence encoding the polypeptide at such sites. Alternatively, the nucleotide sequence of the present invention may be expressed by inserting the nucleotide sequence or a nucleic acid construct comprising the sequence into an appropriate vector for expression. In creating the expression vector, the coding sequence is located in the vector so that the coding sequence is operably linked with the appropriate control sequences for expression.

The recombinant expression vector may be any vector (e.g., a plasmid or virus) which can be conveniently subjected to recombinant DNA procedures and can bring about the expression of the nucleotide sequence. The choice of the vector will typically depend on the compatibility of the vector with the host cell into which the vector is to be introduced. The vectors may be linear or closed circular plasmids.

The vector may be an autonomously replicating vector, i.e. a vector which exists as an extrachromosomal entity, the replication of which is independent of chromosomal replication, e.g. a plasmid, an extrachromosomal element, a minichromosome, or an artificial chromosome.

The vector may contain any means for assuring self-replication. Alternatively, the vector may be one which, when introduced into the host cell, is integrated into the genome and replicated together with the chromosome(s) into which it has been integrated. Furthermore, a single vector or plasmid or two or more vectors or plasmids which together contain the total DNA to be introduced into the genome of the host cell, or a transposon may be used.

The vectors of the present invention preferably contain one or more selectable markers which permit easy selection of transformed cells. A selectable marker is a gene the product of which provides for biocide or viral resistance, resistance to heavy metals, prototrophy to auxotrophs, and the like.

Examples of bacterial selectable markers are the dal genes from *Bacillus subtilis* or *Bacillus licheniformis*, or markers which confer antibiotic resistance such as ampicillin, kanamycin, chloramphenicol or tetracycline resistance. Suitable markers for yeast host cells are ADE2, HIS3, LEU2, LYS2, MET3, TRP1, and URA3. Selectable markers for use in a filamentous fungal host cell include, but are not limited to, amdS (acetamidase), argB (ornithine carbamoyltransferase), bar (phosphinothricin acetyltransferase), hygB (hygromycin phosphotransferase), niaD (nitrate reductase), pyrG (orotidine-5'-phosphate decarboxylase), sC (sulfate adenyltransferase), trpC (anthranilate synthase), as well as equivalents thereof.

Preferred for use in an *Aspergillus* cell are the amdS and pyrG genes of *Aspergillus nidulans* or *Aspergillus oryzae* and the bar gene of *Streptomyces hygroscopicus*.

The vectors of the present invention preferably contain an element(s) that permits stable integration of the vector into the host cell's genome or autonomous replication of the vector in the cell independent of the genome.

For integration into the host cell genome, the vector may rely on the nucleotide sequence encoding the polypeptide or any other element of the vector for stable integration of the vector into the genome by homologous or nonhomologous recombination. Alternatively, the vector may contain additional nucleotide sequences for directing integration by homologous recombination into the genome of the host cell. The additional nucleotide sequences enable the vector to be integrated into the host cell genome at a precise location(s) in the chromosome(s). To increase the likelihood of integration at a precise location, the integrational elements should preferably contain a sufficient number of nucleotides, such as 100 to 1,500 base pairs, preferably 400 to 1,500 base pairs, and most preferably 800 to 1,500 base pairs, which are highly homologous with the corresponding target sequence to enhance the probability of homologous recombination. The integrational elements may be any sequence that is homologous with the target sequence in the genome of the host cell. Furthermore, the integrational elements may be non-encoding or encoding nucleotide sequences. On the other hand, the vector may be integrated into the genome of the host cell by non-homologous recombination.

For autonomous replication, the vector may further comprise an origin of replication enabling the vector to replicate autonomously in the host cell in question. Examples of bacterial origins of replication are the origins of replication of plasmids pBR322, pUC19, pACYC177, and pACYC184 permitting replication in *E. coli*, and pUB110, pE194, pTA1060, and pAMβ1 permitting replication in *Bacillus*. Examples of origins of replication for use in a yeast host cell are the 2 micron origin of replication, ARS1, ARS4, the combination of ARS1 and CEN3, and the combination of ARS4 and CEN6. The origin of replication may be one having a mutation which makes its functioning temperature-sensitive in the host cell (see, e.g., Ehrlich, 1978, *Proceedings of the National Academy of Sciences USA* 75: 1433).

More than one copy of a nucleotide sequence of the present invention may be inserted into the host cell to increase production of the gene product. An increase in the copy number of the nucleotide sequence can be obtained by integrating at least one additional copy of the sequence into the host cell genome or by including an amplifiable selectable marker gene with the nucleotide sequence where cells containing amplified copies of the selectable marker gene, and thereby additional copies of the nucleotide sequence, can be selected for by cultivating the cells in the presence of the appropriate selectable agent.

The procedures used to ligate the elements described above to construct the recombinant expression vectors of the present invention are well known to one skilled in the art (see e.g. Sambrook et al., 1989, supra).

Recombinant Host Cell Comprising Nucleic Acid Construct

The present invention also relates to recombinant a host cell comprising the nucleic acid construct of the invention, which are advantageously used in the recombinant production of the polypeptides. A vector comprising a nucleotide sequence of the present invention is introduced into a host cell so that the vector is maintained as a chromosomal integrant or as a self-replicating extra-chromosomal vector as described earlier.

The host cell may be a unicellular microorganism, e.g., a prokaryote or a non-unicellular microorganism, e.g., a eukaryote.

Useful unicellular cells are bacterial cells such as gram positive bacteria including, but not limited to, a *Bacillus* cell, e.g., *Bacillus alkalophilus, Bacillus amyloliquefaciens, Bacillus brevis, Bacillus circulans, Bacillus clausii, Bacillus coagulans, Bacillus lautus, Bacillus lentus, Bacillus licheniformis, Bacillus megaterium, Bacillus stearothermophilus, Bacillus subtilis*, and *Bacillus thuringiensis*; or a *Streptomyces* cell, e.g., *Streptomyces lividans* or *Streptomyces murinus*, or gram negative bacteria such as *E. coli* and *Pseudomonas* sp. In a preferred embodiment, the bacterial host cell is a *Bacillus lentus, Bacillus licheniformis, Bacillus stearothermophilus*, or *Bacillus subtilis* cell. In another preferred embodiment, the *Bacillus* cell is an alkalophilic *Bacillus*. (KKSC/SALK verify relevans for GH-61 polypeptides)

The introduction of a vector into a bacterial host cell may, for instance, be effected by protoplast transformation (see, e.g., Chang and Cohen, 1979, *Molecular General Genetics* 168: 111–115), using competent cells (see, e.g., Young and Spizizin, 1961, *Journal of Bacteriology* 81: 823–829, or Dubnau and Davidoff-Abelson, 1971, *Journal of Molecular Biology* 56: 209–221), electroporation (see, e.g., Shigekawa and Dower, 1988, *Biotechniques* 6: 742–751), or conjugation (see, e.g., Koehler and Thorne, 1987, *Journal of Bacteriology* 169: 5771–5278).

The host cell may be a eukaryote, such as a mammalian, insect, plant, or fungal cell.

In a preferred embodiment, the host cell is a fungal cell. "Fungi" as used herein includes the phyla Ascomycota, Basidiomycota, Chytridiomycota, and Zygomycota (as defined by Hawksworth et al., In, Ainsworth and Bisby's Dictionary of The Fungi, 8th edition, 1995, CAB International, University Press, Cambridge, UK) as well as the Oomycota (as cited in Hawksworth et al., 1995, supra, page 171) and all mitosporic fungi (Hawksworth et al., 1995, supra).

In a more preferred embodiment, the fungal host cell is a yeast cell. "Yeast" as used herein includes ascosporogenous yeast (Endomycetales), basidiosporogenous yeast, and yeast belonging to the Fungi Imperfecti (Blastomycetes). Since the classification of yeast may change in the future, for the purposes of this invention, yeast shall be defined as described in *Biology and Activities of Yeast* (Skinner, F. A., Passmore, S. M., and Davenport, R. R., eds, Soc. App. Bacteriol. Symposium Series No. 9,1980).

In an even more preferred embodiment, the yeast host cell is a *Candida, Hansenula, Kluyveromyces, Pichia, Saccharomyces, Schizosaccharomyces*, or *Yarrowia* cell.

In a most preferred embodiment, the yeast host cell is a *Saccharomyces carlsbergensis, Saccharomyces cerevisiae, Saccharomyces diastaticus, Saccharomyces douglasii, Saccharomyces kluyveri, Saccharomyces norbensis* or *Saccharomyces oviformis* cell. In another most preferred embodiment, the yeast host cell is a *Kluyveromyces lactis* cell. In another most preferred embodiment, the yeast host cell is a *Yarrowia lipolytica* cell.

In another more preferred embodiment, the fungal host cell is a filamentous fungal cell. "Filamentous fungi" include all filamentous forms of the subdivision Eumycota and Oomycota (as defined by Hawksworth et al., 1995, supra). The filamentous fungi are characterized by a mycelial wall composed of chitin, cellulose, glucan, chitosan, mannan, and other complex polysaccharides. Vegetative growth is by hyphal elongation and carbon catabolism is obligately aerobic. In contrast, vegetative growth by yeasts such as *Saccharomyces cerevisiae* is by budding of a unicellular thallus and carbon catabolism may be fermentative.

In an even more preferred embodiment, the filamentous fungal host cell is a cell of a species of, but not limited to,

*Acremonium, Aspergillus, Fusarium, Humicola, Mucor, Myceliophthora, Neurospora, Penicillium, Thielavia, Tolypocladium,* or *Trichoderma.*

In a most preferred embodiment, the filamentous fungal host cell is an *Aspergillus awamori, Aspergillus foetidus, Aspergillus japonicus, Aspergillus nidulans, Aspergillus niger* or *Aspergillus oryzae* cell. In another most preferred embodiment, the filamentous fungal host cell is a *Fusarium bactridioides, Fusarium cerealis, Fusarium crookwellense, Fusarium culmorum, Fusarium graminearum, Fusarium graminum, Fusarium heterosporum, Fusarium negundi, Fusarium oxysporum, Fusarium reticulatum, Fusarium roseum, Fusarium sambucinum, Fusarium sarcochroum, Fusarium sporotrichioides, Fusarium sulphureum, Fusarium torulosum, Fusarium trichothecioides,* or *Fusarium venenatum* cell. In an even most preferred embodiment, the filamentous fungal parent cell is a *Fusarium venenatum* (Nirenberg sp. nov.) cell. In another most preferred embodiment, the filamentous fungal host cell is a *Humicola insolens, Humicola lanuginosa, Mucor miehei, Myceliophthora thermophila, Neurospora crassa, Penicillium purpurogenum, Thielavia terrestris, Trichoderma harzianum, Trichoderma koningii, Trichoderma longibrachiatum, Trichoderma reesei,* or *Trichoderma viride* cell.

Fungal cells may be transformed by a process involving protoplast formation, transformation of the protoplasts, and regeneration of the cell wall in a manner known per se. Suitable procedures for transformation of *Aspergillus* host cells are described in EP 238 023 and Yelton et al., 1984, *Proceedings of the National Academy of Sciences USA* 81: 1470–1474. Suitable methods for transforming *Fusarium* species are described by Malardier et al., 1989, *Gene* 78: 147–156 and WO 96/00787. Yeast may be transformed using the procedures described by Becker and Guarente, In Abelson, J. N. and Simon, M. I., editors, *Guide to Yeast Genetics and Molecular Biology, Methods in Enzymology,* Volume 194, pp 182–187, Academic Press, Inc., New York; Ito et al., 1983, *Journal of Bacteriology* 153: 163; and Hinnen et al., 1978, *Proceedings of the National Academy of Sciences USA* 75: 1920.

Processes for Preparing Functional GH-61 Polypeptides

The present invention also relates to methods for producing a polypeptide of the present invention comprising (a) cultivating a strain, which in its wild-type form is capable of producing the polypeptide; and (b) recovering the polypeptide. Preferably, the strain is a fungus, more preferably of the genus *Humicola,* particularly *Humicola insolens* or *Coprinus,* such as *Coprinus cinereus* or *Thelavia* such as *Thelavia terrestris*

The present invention also relates to methods for producing a polypeptide of the invention comprising (a) cultivating a host cell under conditions conducive for production of the polypeptide; and (b) recovering the polypeptide.

In the production methods of the present invention, the cells are cultivated in a nutrient medium suitable for production of the polypeptide using methods known in the art. For example, the cell may be cultivated by shake flask cultivation, small-scale or large-scale fermentation (including continuous, batch, fed-batch, or solid state fermentations) in laboratory or industrial fermentors performed in a suitable medium and under conditions allowing the polypeptide to be expressed and/or isolated. The cultivation takes place in a suitable nutrient medium comprising carbon and nitrogen sources and inorganic salts, using procedures known in the art. Suitable media are available from commercial suppliers or may be prepared according to published compositions (e.g., in catalogues of the American Type Culture Collection). If the polypeptide is secreted into the nutrient medium, the polypeptide can be recovered directly from the medium. If the polypeptide is not secreted, it can be recovered from cell lysates.

The polypeptide may be detected and/or identified using methods known in the art and modifications thereof that are specific for the polypeptide. These detection methods may include use of specific antibodies, formation of a polypeptide—carbohydrate complex, or disappearance of an activated carbohydrate substrate, sequencing and alignment, testing in methods for preparing edible products etc. The resulting polypeptide may be recovered by methods known in the art. For example, the polypeptide may be recovered from the nutrient medium by conventional procedures including, but not limited to, centrifugation, filtration, extraction, spray-drying, evaporation, or precipitation.

The polypeptides of the present invention may be purified by a variety of procedures known in the art including, but not limited to, chromatography (e.g., ion exchange, affinity, hydrophobic, chromatofocusing, and size exclusion), electrophoretic procedures (e.g., preparative isoelectric focusing), differential solubility (e.g. ammonium sulfate precipitation), SDS-PAGE, or extraction (see, e.g. *Protein Purification,* J.-C. Janson and Lars Ryden, editors, VCH Publishers, New York, 1989).

Transgenic Plants

The present invention also relates to a transgenic plant, plant part, or plant cell which has been transformed with a nucleotide sequence encoding a polypeptide of the present invention so as to express and produce the polypeptide. In one embodiment the plant could be used as host for production of polypeptide in recoverable quantities. The polypeptide may be recovered from the plant or plant part. Alternatively, the plant or plant part containing the recombinant polypeptide may be used as such for as ingredients in a dough composition having improved quality. The transgenic plant can be dicotyledonous (a dicot) or monocotyledonous (a monocot). Examples of monocot plants are grasses, such as meadow grass (blue grass, Poa), forage grass such as festuca, lolium, temperate grass, such as Agrostis, and cereals, e.g., wheat, oats, rye, barley, rice, sorghum, and maize (corn).

Examples of dicot plants are tobacco, legumes, such as lupins, potato, sugar beet, pea, bean and soybean, and cruciferous plants (family Brassicaceae), such as cauliflower, rape seed, and the closely related model organism *Arabidopsis thaliana.*

Examples of plant parts are stem, callus, leaves, root, fruits, seeds, and tubers. Also specific plant tissues, such as chloroplast, apoplast, mitochondria, vacuole, peroxisomes, and cytoplasm are considered to be a plant part. Furthermore, any plant cell, whatever the tissue origin, is considered to be a plant part.

Also included within the scope of the present invention are the progeny of such plants, plant parts and plant cells.

The transgenic plant or plant cell expressing a polypeptide of the present invention may be constructed in accordance with methods known in the art. Briefly, the plant or plant cell is constructed by incorporating one or more expression constructs encoding a polypeptide of the present invention into the plant host genome and propagating the resulting modified plant or plant cell into a transgenic plant or plant cell.

Conveniently, the expression construct is a nucleic acid construct which comprises a nucleotide sequence encoding a polypeptide of the present invention operably linked with appropriate regulatory sequences required for expression of the nucleotide sequence in the plant or plant part of choice. Furthermore, the expression construct may comprise a selectable marker useful for identifying host cells into which the expression construct has been integrated and DNA sequences necessary for introduction of the construct into the plant in question (the latter depends on the DNA introduction method to be used).

The choice of regulatory sequences, such as promoter and terminator sequences and optionally signal or transit sequences, is determined, for example, on the basis of when, where, and how the polypeptide is desired to be expressed. For instance, the expression of the gene encoding a polypeptide of the present invention may be constitutive or inducible, or may be developmental, stage or tissue specific, and the gene product may be targeted to a specific tissue or plant part such as seeds or leaves. Regulatory sequences are, for example, described by Tague et al., 1988, *Plant Physiology* 86: 506.

For constitutive expression, the 35S-CaMV promoter may be used (Franck et al., 1980, *Cell* 21: 285–294). Organ-specific promoters may be, for example, a promoter from storage sink tissues such as seeds, potato tubers, and fruits (Edwards & Coruzzi, 1990, *Ann. Rev. Genet.* 24: 275–303), or from metabolic sink tissues such as meristems (Ito et al., 1994, *Plant Mol. Biol.* 24: 863–878), a seed specific promoter such as the glutelin, prolamin, globulin, or albumin promoter from rice (Wu et al., 1998, *Plant and Cell Physiology* 39: 885–889), a *Vicia faba* promoter from the legumin B4 and the unknown seed protein gene from *Vicia faba* (Conrad et al., 1998, *Journal of Plant Physiology* 152: 708–711), a promoter from a seed oil body protein (Chen et al., 1998, Plant and Cell Physiology 39: 935–941), the storage protein napA promoter from *Brassica napus*, or any other seed specific promoter known in the art, e.g., as described in WO 91/14772. Furthermore, the promoter may be a leaf specific promoter such as the rbcs promoter from rice or tomato (Kyozuka et al., 1993, *Plant Physiology* 102: 991–1000, the chlorella virus adenine methyltransferase gene promoter (Mitra and Higgins, 1994, *Plant Molecular Biology* 26: 85–93), or the aldP gene promoter from rice (Kagaya et al., 1995, *Molecular and General Genetics* 248: 668–674), or a wound inducible promoter such as the potato pin2 promoter (Xu et al., 1993, *Plant Molecular Biology* 22: 573–588).

A promoter enhancer element may also be used to achieve higher expression of the polypeptide in the plant. For instance, the promoter enhancer element may be an intron which is placed between the promoter and the nucleotide sequence encoding an polypeptide of the present invention. For instance, Xu et al., 1993, supra disclose the use of the first intron of the rice actin 1 gene to enhance expression.

The selectable marker gene and any other parts of the expression construct may be chosen from those available in the art.

The nucleic acid construct is incorporated into the plant genome according to conventional techniques known in the art, including *Agrobacterium*-mediated transformation, virus-mediated transformation, microinjection, particle bombardment, biolistic transformation, and electroporation (Gasser et al., 1990, *Science* 244: 1293; Potrykus, 1990, *Bio/Technology* 8: 535; Shimamoto et al., 1989, *Nature* 338: 274).

Presently, *Agrobacterium tumefaciens*-mediated gene transfer is the method of choice for generating transgenic dicots (for a review, see Hooykas and Schilperoort, 1992, *Plant Molecular Biology* 19: 15–38). However it can also be used for transforming monocots, although other transformation methods are generally preferred for these plants. Presently, the method of choice for generating transgenic monocots is particle bombardment (microscopic gold or tungsten particles coated with the transforming DNA) of embryonic calli or developing embryos (Christou, 1992, *Plant Journal* 2: 275–281; Shimamoto, 1994, *Current Opinion Biotechnology* 5: 158–162; Vasil et al., 1992, *Bio/Technology* 10: 667–674). An alternative method for transformation of monocots is based on protoplast transformation as described by Omirulleh et al., 1993, *Plant Molecular Biology* 21: 415–428.

Following transformation, the transformants having incorporated therein the expression construct are selected and regenerated into whole plants according to methods well-known in the art.

The present invention also relates to methods for producing an polypeptide of the present invention comprising (a) cultivating a transgenic plant or a plant cell comprising a nucleotide sequence encoding an polypeptide of the present invention under conditions conducive for production of the polypeptide; and (b) recovering the polypeptide.

Compositions Comprising Functional GH-61 Polypeptides

In a still further aspect, the present invention relates to compositions comprising a polypeptide of the present invention and their preparation, in particular compositions wherein the polypeptide of the invention is the major component of the composition, e.g., a mono-component composition.

The composition may further comprise one or more enzymes, in particular carbohydrases such as amylase, glucanase, polypeptide, galactanase, mannanase etc, The enzymes may also include enzymes such as aminopeptidase, carboxypeptidase, catalase, chitinase, cutinase, cyclodextrin glycosyltransferase, deoxyribonuclease, esterase, alpha-galactosidase, beta-galactosidase, glucoamylase, alpha-glucosidase, beta-glucosidase, haloperoxidase, invertase, laccase, lipase, mannosidase, oxidase, pectinolytic enzymes, peptidoglutaminase, peroxidase, phytase, polyphenoloxidase, proteolytic enzyme, ribonuclease, transglutaminase, or polypeptide. In a particular embodiment the amylase is a maltogenic amylase, especially a maltogenic exo-amylase such as maltogenic exo-alpha-amylase or maltogenic exo-beta-amylase.

The compositions may be prepared in accordance with methods known in the art and may have any physical appearance such as liquid, paste or solid. For instance, the polypeptide composition may be formulated using methods known to the art of formulating enzymes and/or pharmaceutical products, e.g. into coated or uncoated granules or micro-granules. The polypeptide to be included in the composition may be stabilized in accordance with methods known in the art e.g. by stabilizing the polypeptide in the composition by adding and antioxidant or reducing agent to limit oxidation or the polypeptide of it may be stabilized by adding polymers such as PVP, PVA, PEG or other suitable polymers known to be beneficial to the stability of polypeptides in solid or liquid compositions. When formulating GH-61 polypeptides of the invention as a granulate or agglomerated powder the particles particularly have a narrow particle size distribution with more than 95% (by weight) of the particles in the range from 25 to 500 μm. Granulates and agglomerated powders may be prepared by conventional methods, e.g. by spraying the amylase onto a carrier in a fluid-bed granulator. The carrier may consist of particulate cores having a suitable particle size. The carrier may be soluble or insoluble, e.g. a salt (such as NaCl or sodium sulfate), a sugar (such as sucrose or lactose), a sugar alcohol (such as sorbitol), starch, rice, corn grits, or soy. Hence the invention also provides a granule comprising a GH-61 polypeptide In a particular embodiment the composition is a dough composition or a dough improving additive comprising a GH-61 polypeptide of the invention.

The dough may comprise basis ingredients such as meal, flour or starch such as wheat meal, wheat flour, corn flour, corn starch, rye meal, rye flour, oat flour, oat meal, sorghum meal, sorghum flour, rice flour, potato meal, potato flour or potato starch.

The dough may also comprise other conventional dough ingredients, e.g. proteins, such as milk powder and gluten; eggs (either whole eggs, egg yolks or egg whites); oxidants such as ascorbic acid, potassium bromate, potassium iodate, azodicarbonamide (ADA) or ammonium persulfate; amino acids such as L-cysteine and/or glutamate; sugars; salts such as sodium chloride, calcium acetate, sodium sulfate or calcium sulfate.

The dough may still further comprise fat (triglyceride) such as granulated fat or shortening.

The dough or dough improving additive may still further comprise an emulsifier such as mono- or diglycerides, diacetyl tartaric acid esters of mono- or diglycerides, sugar esters of fatty acids, polyglycerol esters of fatty acids, lactic acid esters of monoglycerides, acetic acid esters of monoglycerides, polyoxyethylene stearates, or lysolecithin.

The dough or dough improving additive may still further comprise a leavening agent such as yeast, usually *Saccharomyces cerevisiae* (baker's yeast) and/or chemical leaving agents such as bicarbonate compounds used in baking powder.

The dough or dough improving additive may further comprise additional enzymes. Such enzymes includes a lipolytic enzyme, particularly phospholipase, galactoilipase and/or triacyl glycerol lipase activity, e.g. as described in WO 9953769, WO 0032758, WO 0200852 or WO 2002066622. Other enzymes may be a amylases, cyclodextrin glucanotransferase, protease or peptidase, in particular an exopeptidase, transglutaminase, lipase, cellulase, hemicellulase, glycosyltransferase, branching enzyme (1,4-□-glucan branching enzyme) or oxidoreductase. The additional enzyme may be of mammalian, plant or microbial (bacterial, yeast or fungal) origin. The amylase may be from a fungus, bacterium or plant. It may be a maltogenic alpha-amylase (EC 3.2.1.133), e.g. from *B. stearothermophilus*, an alpha-amylase, e.g. from *Bacillus*, particularly *B. licheniformis* or *B. amyloliquefaciens*, a beta-amylase, e.g. from plant (e.g. soy bean) or from microbial sources (e.g. *Bacillus*), a glucoamylase, e.g. from *A. niger*, or a fungal alpha-amylase, e.g. from *A. oryzae*. The hemicellulase may be a pentosanase, e.g. a xylanase which may be of microbial origin, e.g. derived from a bacterium or fungus, such as a strain of *Aspergillus*, in particular of *A. aculeatus, A. niger, A. awamori*, or *A. tubigensis*, from a strain of *Trichoderma*, e.g. *T. reesei*, or from a strain of *Humicola*, e.g. *H. insolens*. The protease may be from *Bacillus*, e.g. *B. amyloliquefaciens*. The oxidoreductase may be a glucose oxidase, a hexose oxidase, a lipoxidase, a peroxidase, or a laccase.

The dough may still further appear as fresh, frozen or par-baked dough. It may also be laminated dough.

The amount of GH-61 polypeptide in the composition, particularly the dough, should amount to between 0.5–100 mg polypeptide per kg dry matter in the dough, in particular 0.5–50 mg polypeptide per kg dry matter, in particular 1–25 mg polypeptide per kg dry matter, in particular 1–15 mg polypeptide per kg dry matter in the dough, in particular 2–10 mg/kg.

Considering the findings that the GH-61 polypeptides of the invention have a significant effect in dough compositions it is presently contemplated that as soling in laundry most often also contains foodstuffs it is will also have an effect in removing such soilings from textile in a washing process. Hence in a further embodiment, the composition of the invention is a detergent composition which, in addition to the GH-61 polypeptide of the invention, comprises a surfactant and optionally compounds selected from the group consisting of builders such as zeolites, bleaching agents such as percarbonate, bleach enhancers such as TAED or NOBS, suds suppressors, fragrants, etc.

In a further embodiment, the composition of the invention is a cereal containing feed composition which, in addition to the polypeptide, comprises a cereal or grain product.

In a further embodiment, the composition of the invention is fermentable composition, which in addition to the polypeptide, comprises one or more nutrients for a microorganism.

In a further embodiment, the composition of the invention is a pulping composition, which in addition to the polypeptide, comprises pulp.

Applications of Functional GH-61 Polypeptides

The first aspect of the invention relates to finding that isolated GH-61 polypeptides had significant anti-staling effect when used (in effective amounts for providing an anti-staling effect) for preparing edible products and thus the invention provides use of an anti-staling GH-61 polypeptide for preparing an edible product. This use may in particular involve a method of preparing an edible product comprising heating a dough composition comprising an effective amount of anti-staling GH-61 polypeptide; in particular the method comprises leavening and heating a dough composition. An effective amount of GH-61 polypeptide is the minimum amount required to provide a measurable anti-staling effect in an edible product.

A contemplated embodiment of GH-61 polypeptides of the invention is the use of effective amounts of GH-61 polypeptides for preparation of a cereal containing feed composition comprising mixing a feed mixture with a polypeptide of the invention.

In yet another contemplated embodiment, effective amounts of the GH-61 polypeptide of the invention may be applied in a process hydrolysis of agricultural wastes for production of alcohol fuels.

In yet another contemplated embodiment effective amounts of the GH-61 polypeptide of the invention may be applied in a brewing process wherein the presence of a polypeptide may improve filterability of the wort.

In yet another contemplated embodiment, effective amounts of the GH-61 polypeptide of the invention may be applied in a process for preparation of fruit or vegetable juices, wherein presence of a polypeptide may improve filtration and increase yields.

In yet another contemplated embodiment effective amounts of the GH-61 polypeptide of the invention may be applied in a process for treatment of lignolosic materials and pulp with a polypeptide.

Detergent Disclosure and Examples

The polypeptide of the invention may be added to and thus become a component of a detergent composition.

The detergent composition of the invention may for example be formulated as a hand or machine laundry detergent composition including a laundry additive composition suitable for pre-treatment of stained fabrics and a rinse added fabric softener composition, or be formulated as a detergent composition for use in general household hard surface cleaning operations, or be formulated for hand or machine dishwashing operations.

In a specific aspect, the invention provides a detergent additive comprising the enzyme of the invention. The detergent additive as well as the detergent composition may comprise one or more other enzymes such as a protease, a lipase, a cutinase, an amylase, a carbohydrase, a cellulase, a pectinase, a mannanase, an arabinase, a galactanase, a xylanase, an oxidase, e.g., a laccase, and/or a peroxidase.

In general the properties of the chosen enzyme(s) should be compatible with the selected detergent, (i.e. pH-optimum, compatibility with other enzymatic and non-enzymatic ingredients, etc.), and the enzyme(s) should be present in effective amounts.

Proteases: Suitable proteases include those of animal, vegetable or microbial origin. Microbial origin is preferred. Chemically modified or protein engineered mutants are included. The protease may be a serine protease or a metallo protease, preferably an alkaline microbial protease or a trypsin-like protease. Examples of alkaline proteases are subtilisins, especially those derived from *Bacillus*, e.g., subtilisin Novo, subtilisin Carlsberg, subtilisin 309, subtilisin 147 and subtilisin 168 (described in WO 89/06279). Examples of trypsin-like proteases are trypsin (e.g. of porcine or bovine origin) and the Fusarium protease described in WO 89/06270 and WO 94/25583.

Examples of useful proteases are the variants described in WO 92/19729, WO 98/20115, WO 98/20116, and WO 98/34946, especially the variants with substitutions in one or more of the following positions: 27, 36, 57, 76, 87, 97, 101, 104, 120, 123, 167, 170, 194, 206, 218, 222, 224, 235 and 274.

Preferred commercially available protease enzymes include Alcalase®, Savinase®, Primase®, Duralase®, Esperase®, and Kannase® (Novozymes A/S), Maxatase®, Maxacal®, Maxapem®, Properase®, Purafect®, Purafect OxP®, FN2®), and FN3® (Genencor International Inc.).

Lipases: Suitable lipases include those of bacterial or fungal origin. Chemically modified or protein engineered mutants are included. Examples of useful lipases include lipases from *Humicola* (synonym *Thermomyces*), e.g. from *H. lanuginosa* (*T. lanuginosus*) as described in EP 258 068 and EP 305 216 or from *H. insolens* as described in WO 96/13580, a *Pseudomonas*lipase, e.g. from *P. alcaligenes* or *P. pseudoalcaligenes* (EP 218 272), *P. cepacia* (EP 331 376), *P. stutzeri* (GB 1,372,034), *P. fluorescens*, *Pseudomonas* sp. strain SD 705 (WO 95/06720 and WO 96/27002), *P. wisconsinensis* (WO 96/12012), a *Bacillus* lipase, e.g. from *B. subtilis* (Dartois et al. (1993), Biochemica et Biophysica Acta, 1131, 253–360), *B. stearothermophilus* (JP 64/744992) or *B. pumilus* (WO 91/16422).

Other examples are lipase variants such as those described in WO 92/05249, WO 94/01541, EP 407 225, EP 260 105, WO 95/35381, WO 96/00292, WO 95/30744, WO 94/25578, WO 95/14783, WO 95/22615, WO 97/04079 and WO 97/07202.

Preferred commercially available lipase enzymes include LipolaseTM and Lipase UltraTM (Novozymes A/S).

Amylases: Suitable amylases (alpha and/or beta) include those of bacterial or fungal origin. Chemically modified or protein engineered mutants are included. Amylases include, for example, □-amylases obtained from *Bacillus*, e.g. a special strain of *B. licheniformis*, described in more detail in GB 1,296,839.

Examples of useful amylases are the variants described in WO 94/02597, WO 94/18314, WO 96/23873, and WO 97/43424, especially the variants with substitutions in one or more of the following positions: 15, 23, 105, 106, 124, 128, 133, 154, 156, 181, 188, 190, 197, 202, 208, 209, 243, 264, 304, 305, 391, 408, and 444.

Commercially available amylases are DuraMyl™, TermaMyl™, FungaMyl™ and BAN™ (Novozymes A/S), Rapidase™ and Purastar™ (from Genencor International Inc.).

Cellulases: Suitable cellulases include those of bacterial or fungal origin. Chemically modified or protein engineered mutants are included. Suitable cellulases include cellulases from the genera *Bacillus*, *Pseudomonas*, *Humicola*, *Fusarium*, *Thielavia*, *Acremonium*, e.g. the fungal cellulases produced from *Humicola insolens*, *Myceliophthora thermophila* and *Fusarium oxysporum* disclosed in U.S. Pat. Nos. 4,435,307, 5,648,263, 5,691,178, 5,776,757 and WO 89/09259.

Especially suitable cellulases are the alkaline or neutral cellulases having colour care benefits. Examples of such cellulases are cellulases described in EP 0 495 257, EP 0 531 372, WO 96/11262, WO 96/29397, WO 98/08940. Other examples are cellulase variants such as those described in WO 94/07998, EP 0 531 315, U.S. Pat. Nos. 5,457,046, 5,686,593, 5,763,254, WO 95/24471, WO 98/12307 and PCT/DK98/00299.

Commercially available cellulases include Celluzyme®, and Carezyme® (Novozymes), Clazinase®, and Puradax HA® (Genencor International Inc.), and KAC-500(B)® (Kao Corporation).

Peroxidases/Oxidases: Suitable peroxidases/oxidases include those of plant, bacterial or fungal origin. Chemically modified or protein engineered mutants are included. Examples of useful peroxidases include peroxidases from *Coprinus*, e.g. from *C. cinereus*, and variants thereof as those described in WO 93/24618, WO 95/10602, and WO 98/15257.

Commercially available peroxidases include Guardzyme® (Novozymes A/S).

The detergent enzyme(s) may be included in a detergent composition by adding separate additives containing one or more enzymes, or by adding a combined additive comprising all of these enzymes. A detergent additive of the invention, i.e. a separate additive or a combined additive, can be formulated e.g. as a granulate, a liquid, a slurry, etc. Preferred detergent additive formulations are granulates, in particular non-dusting granulates, liquids, in particular stabilized liquids, or slurries.

Non-dusting granulates may be produced, e.g., as disclosed in U.S. Pat. Nos. 4,106,991 and 4,661,452 and may optionally be coated by methods known in the art. Examples of waxy coating materials are poly(ethylene oxide) products (polyethyleneglycol, PEG) with mean molar weights of 1000 to 20000; ethoxylated nonylphenols having from 16 to 50 ethylene oxide units; ethoxylated fatty alcohols in which the alcohol contains from 12 to 20 carbon atoms and in which there are 15 to 80 ethylene oxide units; fatty alcohols; fatty acids; and mono- and di- and triglycerides of fatty acids. Examples of film-forming coating materials suitable for application by fluid bed techniques are given in GB 1483591. Liquid enzyme preparations may, for instance, be stabilized by adding a polyol such as propylene glycol, a sugar or sugar alcohol, lactic acid or boric acid according to established methods. Protected enzymes may be prepared according to the method disclosed in EP 238,216.

The detergent composition of the invention may be in any convenient form, e.g. a bar, a tablet, a powder, a granule, a paste or a liquid. A liquid detergent may be aqueous, typically containing up to 70% water and 0–30% organic solvent, or non-aqueous.

The detergent composition comprises one or more surfactants, which may be non-ionic including semi-polar and/or anionic and/or cationic and/or zwitterionic. The surfactants are typically present at a level of from 0.1% to 60% by weight.

When included therein the detergent will usually contain from about 1% to about 40% of an anionic surfactant such as linear alkylbenzenesulfonate, alpha-olefinsulfonate, alkyl sulfate (fatty alcohol sulfate), alcohol ethoxysulfate, secondary alkanesulfonate, alpha-sulfo fatty acid methyl ester, alkyl- or alkenylsuccinic acid or soap.

When included therein the detergent will usually contain from about 0.2% to about 40% of a non-ionic surfactant such as alcohol ethoxylate, nonylphenol ethoxylate, alkylpolyglycoside, alkyldimethylamineoxide, ethoxylated fatty acid monoethanolamide, fatty acid monoethanolamide, polyhydroxy alkyl fatty acid amide, or N-acyl N-alkyl derivatives of glucosamine ("glucamides").

The detergent may contain 0–65% of a detergent builder or complexing agent such as zeolite, diphosphate, triphosphate, phosphonate, carbonate, citrate, nitrilotriacetic acid, ethylenediaminetetraacetic acid, diethylenetriaminepentaacetic acid, alkyl- or alkenylsuccinic acid, soluble silicates or layered silicates (e.g. SKS-6 from Hoechst).

The detergent may comprise one or more polymers. Examples are carboxymethylcellulose, poly(vinylpyrrolidone), poly (ethylene glycol), poly(vinyl alcohol), poly (vinylpyridine-N-oxide), poly(vinylimidazole), polycarboxylates such as polyacrylates, maleic/acrylic acid copolymers and lauryl methacrylate/acrylic acid copolymers.

The detergent may contain a bleaching system which may comprise a H2O2 source such as perborate or percarbonate which may be combined with a peracid-forming bleach activator such as tetraacetylethylenediamine or nonanoyloxybenzenesulfonate. Alternatively, the bleaching system may comprise peroxyacids of e.g. the amide, imide, or sulfone type.

The enzyme(s) of the detergent composition of the invention may be stabilized using conventional stabilizing agents, e.g., a polyol such as propylene glycol or glycerol, a sugar or sugar alcohol, lactic acid, boric acid, or a boric acid derivative, e.g., an aromatic borate ester, or a phenyl boronic acid derivative such as 4-formylphenyl boronic acid, and the composition may be formulated as described in e.g. WO 92/19709 and WO 92/19708.

The detergent may also contain other conventional detergent ingredients such as e.g. fabric conditioners including clays, foam boosters, suds suppressors, anti-corrosion agents, soil-suspending agents, anti-soil redeposition agents, dyes, bactericides, optical brighteners, hydro-tropes, tarnish inhibitors, or perfumes.

It is at present contemplated that in the detergent compositions any enzyme, in particular the enzyme of the invention, may be added in an amount corresponding to 0.01–100 mg of enzyme protein per liter of wash liquor, preferably 0.05–5 mg of enzyme protein per liter of wash liquor, in particular 0.1–1 mg of enzyme protein per liter of wash liquor.

The enzyme of the invention may additionally be incorporated in the detergent formulations disclosed in WO 97/07202 which is hereby incorporated as reference.

EXAMPLES

Example 1

Isolation of DNA Including GH-61 Polypeptides from *The lavia terrestris*

Mycelium of a *T. terrestris* is grown on MEX-1 to induce proteins that respond to complex cellulosic medias. After 4 days at 37° C., the mycelium is harvested by filtration though Whatman 1MM filter paper. Mycelium is frozen in liquid nitrogen and stored until further use. RNA isolation is performed according to the protocol of Chomczyniski and Sacchi, 1987 (Analytical Biochemistry 162: 156–159). The Poly(A) Quik mRNA isolation kit is used to purify polyA enriched RNA for cDNA production (Stratagene USA). Production of a cDNA library is achieved according to the SMART cDNA library construction kit (Clontech USA). Sfil restricted double strand cDNAs are cloned into Lambda TriplEx vector and the plasmid containing colonies is recovered by mass excision according to the SMART protocol.

Individual plasmids containing cDNAs are prepared using existing 96 well silica based plasmid preparation systems such as Qiagen Qia-turbo 96, Qiagen corp. USA). Once plasmid template is prepared, all plasmids are sequenced with the vector forward primer using conventional sequencing methods and equipment.

Identification of GH61 Expressed Sequence Tags (ESTs) are achieved by searching the entire non redundant protein database (for example, SWALL) with a program such as BlastP (Altschul, S. F., Gish, W., Miller, W., Myers, E. W. & Lipman, D. J. (1990) "Basic local alignment search tool." J. Mol. Biol. 215:403–410. Gish, W. & States, D. J. (1993) "Identification of protein coding regions by database similarity search." Nature Genet. 3:266–272. Madden, T. L., Tatusov, R. L. & Zhang, J. (1996) "Applications of network BLAST server" Meth. Enzymol. 266:131–141. Altschul, S. F., Madden, T. L., Schäffer, A. A., Zhang, J., Zhang, Z., Miller, W. & Lipman, D. J. (1997) "Gapped BLAST and PSI-BLAST: a new generation of protein database search programs." Nucleic Acids Res. 25:3389–3402. Zhang, J. & Madden, T. L. (1997) "PowerBLAST: A new network BLAST application for interactive or automated sequence analysis and annotation." Genome Res. 7:649–656.

Sequences with similarities to existing GH-61 family sequences are identified based on a blast probability score matrix.

A clone containing SEQ ID NO: 1 was selected for further analysis

Example 2

Isolation of DNA Encoding GH-61 Polypeptides from *Coprinus cinereus*

The procedure of example 1 was repeated for a strain of *Humicola insolens*, A clone containing SEQ ID NO: 3 was selected for further analysis.

Example 3

Isolation Of DNA Encoding GH-61 Polypeptides from *Humicola insolens*

The procedure of example 1 was repeated for a strain of *Coprinus cinereus* for example *Coprinius cinerus* (CBS394.65) obtainable from the CBS. A clone containing SEQ ID NO: 5 was selected for further analysis.

Example 4

Construction of an *Aspergillus* Expression Vector for GH61 DNA Sequences

SEQ ID NO: 3 was amplified in the following manner: 1 microliter of cDNA (approximately 10 nanograms of DNA) was used as template in a PCR reaction with the two primers A and B.

```
                                          (SEQ ID NO:7)
Primer A: 5'-GCGGAATTCATCATGAGGCCCTTCTCCCTC-3'

(SEQ ID NO:8)
Primer B: 5'-ATTTGCGGCCGCTTCCCGTCATCCTCTAAGGC-3'
```

SEQ ID NO: 1 and 5 can be amplified in a similar manner using the primers:

For SEQ. ID NO: 1:

```
                                          (SEQ ID NO:9)
Primer A: 5'-GCGGAATTCATGAAGCTCACCACCTCGGT-3'

(SEQ ID NO:10)
Primer B: 5'-ATTTGCGGCCGCGCAGCCAACCAACCTGGAAT-3'
```

For SEQ ID NO: 5:

```
                                          (SEQ ID NO:11)
Primer A: 5'-GCGGAATTCACAATGAAGGTCTTCGCATAC-3'

(SEQ ID NO:12)
primer B: 5'-ATTTGCGGCCGCACGATGCGATGAGCATTTAT-3'
```

5 pmoles of each primer was used in a 50 microliter reaction volume. The Qiagen ProofStart high fidelity DNA polymerase and buffer were used according to the manufacturer's instructions (Qiagen, USA). Briefly, the reaction was placed in a thermal cycler (MJ Research, Dyad, USA) and cycled under the following reaction conditions: An initial denaturation of 5 minutes at 95 degrees Celsius, 25 cycles of the following: 94 degrees-30 seconds, 55 degrees-30 seconds, 72 degrees 2 minutes. A final extension temperature of 72 degrees for 10 minutes was then used. Aliquots of the PCR reaction were separated on a 1% agarose gel. One distinct band was seen: The size of this band (1.1 kb) corresponded well with the predicted size of the open reading frame.

The fragment was digested with EcoRI and NotI which cut in the overhangs introduced by the PCR primers. The digested fragments were isolated and cloned into pMStr54, an *Aspergillus* expression plasmid based on the plasmid pCaHj527 (see the examples of international patent application WO 00/70064) constructed as described in example 7 of WO 02/12472. Plasmid DNA was isolated from colonies of the cloning experiment. The colonies were sequenced with vector primers PNA21 (5'-GTT TCC MC TCA ATT TAC CTC-3') and MHas5NotI (5'-TTG CCC TCA TCC CCA TCC TTT-3') which prime in opposite directions into the plasmid insert. It was determined that no errors were introduced in any of the insert sequences as a result of PCR.

Example 5

Expression of SEQ ID NOS: 1, 3 and 5 in *Aspergillus*:

SEQ ID NOS: 1, 3 and 5 were transformed into *Aspergillus oryzae* strain JAL355 (disclosed in international patent application WO 01/98484A1). Transformants of SEQ ID NOS: 1,3 and 5 were re-isolated twice under selective and noninducing conditions on Cove minimal plates with 1M sucrose as a carbon source and 10 mM nitrate. (See recipe of the manufacturer) To test expression of SEQ ID NOS: 1,3 and 5, transformants were grown for 3 days and 4 days at 30 degrees celsius in tubes with 10 ml YPM (2% peptone, 1% yeast extract, 2% maltose). Supernatants were run on NuPage 10% Bis-Tris SDS gels (Invitrogen) as recommended by the manufacturer. All *Aspergillus* isolates grew well even when induced for the expression of SEQ ID NOS: 1, 3 and 5.

Example 6

Purification of SEQ ID NO: 2 from Expression of SEQ ID NOS: 1 in *Aspergillus*:

A culture supernatant from a fermentation of the *Aspergillus oryzae* strain expressing SEQ ID NO: 1 was filtered through a 0.22 µm filter to remove the mycelia. 350 ml of the filtered supernatant was diluted to 1450 ml with water and pH adjusted to 7.5 resulting in a conductivity of 1.8 mS/cm. This solution was loaded onto a 50 ml Q-Sepharose anion exchange column equilibrated with 25 mM Tris pH 7.5. The column was washed with about 15 column volumes of 25 mM Tris pH 7.5 and bound proteins were eluted with a NaCl gradient increasing linearly from 0 to 0.5 M over 20 column volumes. From SDS-PAGE it was seen that a polypeptide with a molecular weight of about 29 kDa was eluted during the wash with 25 mM Tris, pH 7.5. Fractions containing the 29 kDa polypeptide were pooled and concentrated on an Amicon ultrafiltration device with a 6 kDa cut off filter (Dow, GR 81PP). The concentrated pool was at least 95% pure as estimated from SDS-PAGE and N-terminal sequencing of the polypeptide gave the sequence corresponding to SEQ ID NO: 2 (HYTFPQTDINGQLSGE).

Example 7

Purification of SEQ ID NO: 4 from Expression of SEQ ID NOS: 3 in *Aspergillus*:

A culture supernatant from a fermentation of the *Aspergillus oryzae* strain expressing SEQ ID NO: 3 was filtered through a 0.22 µm filter to remove the mycelia. 500 ml of the filtered supernatant was ultrafiltrated in a Filtron device with a 10 kDa cut off membrane. pH was adjusted to 9.5 and the filtrate loaded onto a 50 ml Q-Sepharose anion exchange column equilibrated with 25 mM glycine pH 9.5. The column was washed with about two column volumes of 25 mM glycine pH 9.5 and bound proteins were eluted with a NaCl gradient increasing linearly from 0 to 0.5 M over 20 column volumes. From SDS-PAGE it was seen that a polypeptide with a molecular weight of about 32 kDa was eluted during the wash with 25 mM glycine pH 9.5. Fractions containing the 32 kDa polypeptide were pooled and concentrated on an Amicon ultrafiltration device with a 20 kDa cut off filter (DDS, GR 61PP). Purity of the concentrated pool was around 85% as estimated from SDS-PAGE and concentration around 2.4 mg/ml estimated from absorbance at 280 nm and theoretical extinction coefficient.

Example 8

Testing Activity of SEQ ID NOS: 2, 4 and 6

An oat AZCL-xylan, a birchwood AZCL-xylan and a wheat AZCL arabinoxylan substrate suspension were prepared by suspending 2 milligram per milliliter of the substrate in a Nap buffer, pH 7 containing 0.0225% w/w Brij.

Activity of the purified SEQ ID NOS 2, 4 and 6 were tested by mixing 500 microliter substrate suspension with 100 microliter of a solution containing isolated SEQ ID NOS 2, 4 or 6. This mixture was incubated at 37° C., wherein after undigested substrate was sedimentated by centrifugation and digested substrate was evaluated by measuring absorbance of the supernatant at 590 nanometers. A blank value determined by replacing for one sample the enzyme solution with a buffer was subtracted the absorbance measurements.

Results:

| GH-61 polypeptide | Absorbance for Oat AZCL-xylan | Absorbance for Birchwood AZCL-xylan | Absorbance for Wheat AZCL-arabinoxylan |
| --- | --- | --- | --- |
| SEQ ID NO: 2 | 0.0172 | 0.1077 | 0.1296 |
| SEQ ID NO: 4 | 0.0798 | 0.4017 | 0.8128 |
| SEQ ID NO: 6 | 0.0536 | 0.2064 | 0.6101 |

These results indicate that the GH-61 polypeptides have at least a minor activity against these substrates.

Example 9

Testing Effect of SEQ ID NOS: 2 and 4 on Quality of Baked Bread

Bread was baked according to the Sponge & Dough method from 2 kg of flour. Ca propionate was added to the recipe. The Sponge & Dough method is a recognized standard method well known to the skilled person, see for example *Bread & Bread Making;* Mauri Integrated Ingredient, 10th Edition, November 1995, chapter 3.3.

Enzymes were dosed according to the table below:

| | 1 | 2 | 3 | 4 | 5 | 6 | 7 | 8 |
| --- | --- | --- | --- | --- | --- | --- | --- | --- |
| Novamyl MANU/kg | 400 | 400 | 400 | 400 | 400 | 400 | 400 | 400 |
| Shearzyme FXU/kg | | | | | | | | 200 |
| H. insolens SEQ ID NO: 4 mg/kg | | | 4 | 8 | | | | |
| T. terrestris SEQ ID NO: 2 mg/kg | | | | | 1 | 2 | 5 | |

Bread was packed in plastic bags and stored at room temperature until analysis. Texture and NMR were measured on day 7, 14 and 21 and a small sensory evaluation was performed on day 21.

Texture Measurements

Firmness and elasticity data are shown in table 1 & 2.

TABLE 1

Change in Firmness during storage

| | Day | | |
| --- | --- | --- | --- |
| Firmness (g) | 7 | 14 | 21 |
| 400 MANU/kg Novamyl | 379 | 531 | 784 |
| 400 MANU/kg Novamyl + 4 mg/kg SEQ ID NO: 4 | 455 | 630 | 866 |
| 400 MANU/kg Novamyl + 8 mg/kg SEQ ID NO: 4 | 494 | 691 | 778 |
| 400 MANU/kg Novamyl + 1 mg/kg SEQ ID NO: 2 | 442 | 642 | 871 |
| 400 MANU/kg Novamyl + 2 mg/kg SEQ ID NO: 2 | 405 | 539 | 618 |
| 400 MANU/kg Novamyl + 5 mg/kg SEQ ID NO: 2 | 434 | 530 | 788 |
| 400 MANU/kg Novamyl | 461 | 580 | 671 |
| 400 MANU/kg Novamyl + 200 FXU/kg Shearzyme | 518 | 773 | 986 |

TABLE 2

Change in Elasticity during storage

| | Day | | |
| --- | --- | --- | --- |
| Elasticity % (g/g) | 7 | 14 | 21 |
| 400 MANU/kg Novamyl | 52.8 | 49.9 | 47.9 |
| 400 MANU/kg Novamyl + 4 mg/kg SEQ ID NO: 4 | 51.3 | 47.5 | 46.1 |
| 400 MANU/kg Novamyl + 8 mg/kg SEQ ID NO: 4 | 52.2 | 47.8 | 48.6 |
| 400 MANU/kg Novamyl + 1 mg/kg SEQ ID NO: 2 | 52.7 | 48.0 | 46.9 |
| 400 MANU/kg Novamyl + 2 mg/kg SEQ ID NO: 2 | 51.9 | 48.8 | 48.5 |
| 400 MANU/kg Novamyl + 5 mg/kg SEQ ID NO: 2 | 51.9 | 49.5 | 47.0 |
| 400 MANU/kg Novamyl | 52.6 | 49.2 | 48.8 |
| 400 MANU/kg Novamyl + 200 FXU/kg Shearzyme | 51.1 | 46.5 | 44.8 |

The GH 61 polypeptides show promising results compared to the lead combination=Novamyl+Shearzyme. Especially SEQ ID NO:2 in combination with Novamyl shows anti-staling effect on softness and elasticity comparable to or better than Novamyl alone.

Water Characteristics

Amount and mobility of water was measured by NMR. The amount and mobility of the free water, believed to correlate with the moist feeling of bread, is shown in table 3.

TABLE 3

Change in water mobility with time (NMR)

| | Day | | |
| --- | --- | --- | --- |
| Mobility of free water (μs) | 7 | 14 | 21 |
| 400 MANU/kg Novamyl | 7398 | 6801 | 6015 |
| 400 MANU/kg Novamyl + 4 mg/kg SEQ ID NO: 4 | 7333 | 6977 | 5994 |
| 400 MANU/kg Novamyl + 8 mg/kg SEQ ID NO: 4 | 7243 | 6721 | 6302 |
| 400 MANU/kg Novamyl + 1 mg/kg SEQ ID NO: 2 | 7116 | 6617 | 6035 |
| 400 MANU/kg Novamyl + 2 mg/kg SEQ ID NO: 2 | 7552 | 7047 | 6221 |
| 400 MANU/kg Novamyl + 5 mg/kg SEQ ID NO: 2 | 7360 | 6942 | 6077 |
| 400 MANU/kg Novamyl | 7582 | 7067 | 6227 |
| 400 MANU/kg Novamyl + 200 FXU/kg Shearzyme | 7359 | 6686 | 6039 |

The two Novamyl references show very different results in the measurement of water mobility by NMR. The "best" of the Novamyl references show comparable effect to SEQ ID NO:2 in combination with Novamyl, however the second Novamyl reference show significantly inferior results to these.

Sensory Evaluation

A sensory evaluation was made by a panel of people skilled in the art of baking bread. The bread with the GH61 polypeptide of SEQ ID NO:2 in combinations with Novamyl was picked as the very best regarding perception of moistness and softness. This sensory evaluation correlates with migration of free water (measured by NMR), which can be related to moistness.

Conclusion

The GH-61 polypeptides—especially SEQ ID NO:2—show significant anti-staling effects and improves the quality of bread prepared using the polypeptides. In particular fresh-keeping of bread, in particular softness, elasticity, perception of moistness and moisture retention capacity is improved.

Also the combination of GH-61 polypeptides with for example Novamyl, which is a maltogenic exo-amylase show improvements effect on softness of bread, measured by texture analysis and at the same time elasticity was more or less maintained compared to Novamyl alone.

The invention claimed is:

1. An isolated glycoside hydrolase 61 (GH-61) polypeptide which is selected from the group consisting of:
   (a) a polypeptide that has an amino acid sequence which has at least 95% identity to: amino acids 1-216 of SEQ ID NO: 2, amino acids 1-304 of SEQ ID NO: 4, or amino acids 1-204 of SEQ ID NO: 6;
   (b) a polypeptide which is encoded by a nucleotide sequence which hybridizes under high stringency conditions with any of the following polynucleotide probes:
      (i) the complementary strand of nucleotides 52–699 of SEQ ID NO: 1, 46–957 of SEQ ID NO: 3, or 58–660 of SEQ ID NO: 5,
      (ii) the complementary strand of nucleotides 46 to 857 of SEQ ID NO: 3,
      (iii) the complementary strand of nucleotides 52–300 of SEQ ID NO: 1, 46–501 of SEQ ID NO: 3, or 58–300 of SEQ ID NO: 5, and
      (iv) the complementary strand of nucleotides 301–699 of SEQ ID NO: 1, 502–957 of SEQ ID NO: 3, or 301–660 of SEQ ID NO: 5.

2. The polypeptide of claim 1, which has an amino acid sequence which has at least 95% identity with amino acids 1–216 of SEQ ID NO: 2.

3. The polypeptide of claim 1, which has an amino acid sequence which comprises amino acids 1–216 of SEQ ID NO: 2.

4. The polypeptide of claim 1, which has an amino acid sequence which has at least 95% identity with amino acids 1–304 of SEQ ID NO: 4.

5. The polypeptide of claim 1, which has an amino acid sequence which comprises amino acids 1–304 of SEQ ID NO: 4.

6. The polypeptide of claim 1, which has an amino acid sequence which has at least 95% identity with amino acids 1–201 of SEQ ID NO: 6.

7. The polypeptide of claim 1, which has an amino acid sequence which comprises amino acids 1–201 of SEQ ID NO: 6.

8. The polypeptide of claim 1, wherein the polypeptide differs from amino acids of the mature polypeptide of SEQ ID NO: 2, SEQ ID NO: 4 or SEQ ID NO: 6 by at the most ten amino acids.

9. The polypeptide of claim 1, wherein the polypeptide consists of the amino acid sequence of the mature polypeptide of SEQ ID NO: 2, SEQ ID NO: 4 or SEQ ID NO: 6.

10. The polypeptide of claim 1, comprising an amino acid sequence having H at position 1, A or P at position 59, G at position 60, G at position 75, P or A at position 76, W or F at position 100, F or T at position 101, K or C at position 102, I or V or L at position 103, L or I or V or M at position 130, P at position 131, G at position 137, Y at position 139, L or V or I or M at position 140, L or V or I or M at position 141, R at position 142, E or Q at positions 143–144, L or V or I at position 148, H or N at position 149, C at position 163 and P and G and P at positions 209–211 respectively.

11. The polypeptide of claim 1, which is encoded by a nucleotide sequence which hybridizes under high stringency conditions with any of the following polynucleotide probes:
   (a) the complementary strand of nucleotides 52–699 of SEQ ID NO: 1, 46–957 of SEQ ID NO: 3, or 58–660 of SEQ ID NO: 5,
   (b) the complementary strand of nucleotides 48 to 857 of SEQ ID NO: 3,
   (c) the complementary strand of nucleotides 52–300 of SEQ ID NO: 1, 46–501 of SEQ ID NO: 3, or 58–300 of SEQ ID NO: 5, and
   (d) the complementary strand of nucleotides 301–699 of SEQ ID NO: 1, 502–957 of SEQ ID NO: 3, or 301–660 of SEQ ID NO: 5.

12. A method for preparing an edible product, comprising:
   (a) adding a glycoside hydrolase 61 (GH-61) polypeptide of claim 1 to a dough in an amount effective to retard the staling of the edible product prepared from the dough composition; and
   (b) heating the dough composition.

13. The method of claim 12, further comprising leavening the dough composition before heating.

14. The method of claim 12, wherein the heating comprises baking the dough composition.

15. The method of claim 12, wherein the heating comprises steaming the dough composition.

16. The method of claim 12, wherein the edible product is a bread.

17. The method of claim 12, further comprising adding a maltogenic amylase to the dough composition.

18. A dough composition, comprising a glycoside hydrolase 61 (GH-61) polypeptide of claim 1 and at least one ingredient selected from the group consisting of meal, flour and starch.

19. The dough composition of claim 18, wherein the GH-61 polypeptide is in the form of a granule.

20. The dough composition of claim 18, wherein dough is fresh, frozen, par-baked or laminated dough.

21. The dough composition of claim 18, wherein the GH-61 polypeptide is added in an amount of 0.5–100 mg GH-61 polypeptide per kg dry matter in the dough composition.

22. The dough composition of claim 18, wherein the dough composition further comprises one or more additional ingredients selected from the group consisting of protein, eggs, oxidants, sugars, fat and salts.

23. The dough composition of claim 18, wherein the dough composition further comprises an emulsifier.

24. The dough composition of claim 18, wherein the dough composition further comprises a leavening agent.

25. The dough composition of claim 18, wherein the dough composition further comprises a maltogenic amylase.

* * * * *